United States Patent
Eyole et al.

(10) Patent No.: US 11,106,465 B2
(45) Date of Patent: Aug. 31, 2021

(54) VECTOR ADD-WITH-CARRY INSTRUCTION

(71) Applicant: Arm Limited, Cambridge (GB)

(72) Inventors: Mbou Eyole, Cambridge (GB); Nigel John Stephens, Cambridge (GB); Neil Burgess, Cambridge (GB); Grigorios Magklis, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/650,999

(22) PCT Filed: Nov. 15, 2018

(86) PCT No.: PCT/EP2018/081444
§ 371 (c)(1),
(2) Date: Mar. 26, 2020

(87) PCT Pub. No.: WO2019/115142
PCT Pub. Date: Jun. 20, 2019

(65) Prior Publication Data
US 2020/0319885 A1    Oct. 8, 2020

(30) Foreign Application Priority Data

Dec. 13, 2017  (EP) .................................... 17386048

(51) Int. Cl.
*G06F 9/30* (2018.01)
*G06F 7/50* (2006.01)

(52) U.S. Cl.
CPC ............ *G06F 9/30145* (2013.01); *G06F 7/50* (2013.01); *G06F 9/3001* (2013.01); *G06F 9/30094* (2013.01); *G06F 9/30098* (2013.01)

(58) Field of Classification Search
None
See application file for complete search history.

(56) References Cited

U.S. PATENT DOCUMENTS

| | | | | |
|---|---|---|---|---|
| 4,128,880 A | * | 12/1978 | Cray, Jr. | G06F 9/3885 711/100 |
| 6,295,597 B1 | * | 9/2001 | Resnick | G06F 7/50 712/8 |
| 7,334,110 B1 | * | 2/2008 | Faanes | G06F 9/384 712/3 |
| 9,400,651 B2 | * | 7/2016 | Gonion | G06F 9/30036 |
| 9,817,663 B2 | * | 11/2017 | Gonion | G06F 9/30112 |
| 2006/0259737 A1 | * | 11/2006 | Sachs | G06F 9/30032 712/5 |
| 2008/0016320 A1 | * | 1/2008 | Menon | G06F 9/30014 712/22 |

(Continued)

OTHER PUBLICATIONS

International Search Report and Written Opinion of the ISA for PCT/EP2018/081444 dated Jan. 21, 2019, 16 pages.

(Continued)

*Primary Examiner* — Eric Coleman
(74) *Attorney, Agent, or Firm* — Nixon & Vanderhye P.C.

(57) ABSTRACT

Vector add-with-carry instructions are described which use some elements of a destination vector register, or corresponding fields of a predicate register, to provide the carry information corresponding to results of an add-with-carry operation. This is useful for accelerating computations involving multiplications of long integer values.

15 Claims, 18 Drawing Sheets

(56) References Cited

U.S. PATENT DOCUMENTS

| 2015/0019835 A1* | 1/2015 | Anderson | G06F 9/3853 |
| | | | 712/3 |
| 2015/0227367 A1* | 8/2015 | Eyole-Monono | G06F 9/3887 |
| | | | 712/7 |
| 2016/0124905 A1* | 5/2016 | Lutz | G06F 5/012 |
| | | | 708/190 |

OTHER PUBLICATIONS

Extended Search Report for EP17386048.7 dated Jun. 19, 2018, 12 pages.
Robert Bedichek, "Some Efficient Architecture Simulation Techniques," Proceedings of the Winter 1990 USENIX Conference, Jan. 22-26, 1990, 12 pages.

\* cited by examiner $$C = A_H \cdot B_H 2^n + ((A_L + A_H) \cdot (B_L + B_H) - A_L \cdot B_L - A_H \cdot B_H) 2^{n/2} + A_L \cdot B_L$$

$$(A_L + A_H) \cdot (B_L + B_H) - A_L \cdot B_L - A_H \cdot B_H = A_L \cdot B_L + A_H \cdot B_H - |A_H - A_L| \cdot |B_H - B_L|$$

| | | |
|---|---|---|
| 1 | mul | za1b0L, z1.d, z4.d |
| 2 | mulh | za1b0H, z1.d, z4.d |
| 3 | mul | za1b1L, z1.d, z5.d |
| 4 | mulh | za1b1H, z1.d, z5.d |
| 5 | mul | za1b2L, z1.d, z6.d |
| 6 | mulh | za1b2H, z1.d, z6.d |
| 7 | mul | za1b3L, z1.d, z7.d |
| 8 | mulh | za1b3H, z1.d, z7.d |
| 9 | | |
| 10 | adclb | zacc1LB, za1b0H, z_zero |
| 11 | adclt | zacc1LT, za1b0H, z_zero |
| 12 | adclb | zacc0HB, za1b0L, z_zero |
| 13 | adclt | zacc0HT, za1b0L, z_zero |
| 14 | adclb | zacc1HB, za1b1H, zacc1LB |
| 15 | adclt | zacc1HT, za1b1H, zacc1LT |
| 16 | adclb | zacc1LB, za1b1L, zacc0HB |
| 17 | adclt | zacc1LT, za1b1L, zacc0HT |
| 18 | adclb | zacc2LB, za1b2H, zacc1HB |
| 19 | adclt | zacc2LT, za1b2H, zacc1HT |
| 20 | adclb | zacc1HB, za1b2L, zacc1LB |
| 21 | adclt | zacc1HT, za1b2L, zacc1LT |
| 22 | //store | |
| 23 | trn1 | ztemp, zacc0HB, zacc0HT |
| 24 | st1d | {ztemp}, p1, [zptr, #8] |
| 25 | //** | |
| 26 | adclb | zacc2HB, z_zero, zacc2LB |
| 27 | adclt | zacc2HT, z_zero, zacc2LT //no carryout possible |
| 28 | | |
| 29 | adclb | zacc2LB, za1b3L, zacc1HB |
| 30 | adclt | zacc2LT, za1b3L, zacc1HT |
| 31 | //fixup carry | |
| 32 | adclb | zacc2HB, za1b3H, zacc2LB |
| 33 | adclt | zacc2HT, za1b3H, zacc2LT |
| 34 | trn2 | zacc3LB, zacc2HB, z_zero |
| 35 | trn2 | zacc3LT, zacc2HT, z_zero |

FIG. 8

$ADCLB(AccB[i], P_{0i}lo, 0) \rightarrow AccB[i], c_{AccBi}$ $ADCLB(AccB[i+1], P_{1i}lo, c_{AccBi}) \rightarrow AccB[i+1], c_{AccBi+1}$ $ADCLB(AccB[i+2], P_{2i}lo, c_{AccBi+1}) \rightarrow AccB[i+2], c_{AccBi+2}$ $ADCLB(AccB[i+1], P_{0i}hi, 0) \rightarrow AccB[i+1], c_{AccBi+1}$ $ADCLB(AccB[i+3], P_{3i}lo, c_{AccBi+2}) \rightarrow AccB[i+3], c_{AccBi+3}$ $ADCLB(AccB[i+2], P_{1i}hi, c_{AccBi+1}) \rightarrow AccB[i+2], c_{AccBi+2}$ $ADCLB(0, P_{3i}hi, c_{AccBi+3}) \rightarrow AccB[i+4], 0$ $ADCLB(AccB[i+3], P_{2i}hi, c_{AccBi+2}) \rightarrow AccB[i+3], c_{AccBi+3}$ $ADCLB(AccB[i+4], 0, c_{AccBi+3}) \rightarrow AccB[i+4], 0$

FIG. 9

VECTOR ADD-WITH-CARRY INSTRUCTION

This application is the U.S. national phase of International Application No. PCT/EP2018/081444 filed Nov. 15, 2018 which designated the U.S. and claims priority to EP Patent Application No. 17386048.7 filed Dec. 13, 2017, the entire contents of each of which are hereby incorporated by reference.

The present technique relates to the field of data processing.

Some data processing systems support processing of vector instructions which act on, or generate, vector operands comprising multiple data elements. By supporting the processing of a number of distinct data elements in response to a single instruction, code density can be improved and the overhead of fetching and decoding of instructions reduced in comparison to performing the same operations using scalar instructions.

At least some examples provide an apparatus comprising:
processing circuitry to perform data processing;
instruction decoding circuitry to decode instructions to control the processing circuitry to perform the data processing; and
a plurality of vector registers to store vector operands comprising a plurality of data elements; in which:
the instruction decoding circuitry is responsive to a vector add-with-carry instruction specifying a destination vector register, a first data source vector register, a second data source vector register, and a carry source vector register, at least the destination vector register and the carry source vector register each specifying operands comprising at least one pair of data elements, each pair comprising a first data element and a second data element, to control the processing circuitry, for each pair of data elements of the destination vector register, to:
  update the first data element of the pair of data elements of the destination vector register with a value corresponding to a result of an addition of a first source data value obtained from a selected data element of the first data source vector register, a second source data value obtained from a selected data element of the second data source vector register, and a carry value obtained from the second data element of a corresponding pair of data elements of the carry source vector register; and
  update the second data element of the pair of data elements of the destination vector register with a value corresponding to a carry output of said addition.

At least some examples provide a computer for controlling a host processing apparatus to provide an instruction execution environment for executing instructions of target program code, the computer program comprising:
instruction decoding program logic to decode instructions of the target program code to control processing program logic to perform data processing; and
a vector register data structure to store data representing a plurality of vector registers for storing vector operands comprising a plurality of data elements; in which:
the instruction decoding program logic is responsive to a vector add-with-carry instruction specifying a destination vector register, a first data source vector register, a second data source vector register, and a carry source vector register, at least the destination vector register and the carry source vector register each specifying operands comprising at least one pair of data elements, each pair comprising a first data element and a second data element, to control the processing program logic, for each pair of data elements of the destination vector register, to update the vector register data structure to:
  update the first data element of the pair of data elements of the destination vector register with a value corresponding to a result of an addition of a first source data value obtained from a selected data element of the first data source vector register, a second source data value obtained from a selected data element of the second data source vector register, and a carry value obtained from the second data element of a corresponding pair of data elements of the carry source vector register; and
  update the second data element of the pair of data elements of the destination vector register with a value corresponding to a carry output of said addition.

At least some examples provide a data processing method comprising:
decoding a vector add-with-carry instruction specifying a destination vector register, a first data source vector register, a second data source vector register, and a carry source vector register, at least the destination vector register and the carry source vector register each specifying operands comprising at least one pair of data elements, each pair comprising a first data element and a second data element; and
in response to decoding of the vector add-with-carry instruction, controlling processing circuitry, for each pair of data elements of the destination vector register, to:
  update the first data element of the pair of data elements of the destination vector register with a new value corresponding to a result of an addition of a first source data value obtained from a selected data element of the first data source vector, a second source data value obtained from a selected data element of the second data source vector register, and a carry value obtained from the second data element of a corresponding pair of data elements of the carry source vector register; and
  update the second data element of the pair of data elements of the destination vector register with a value corresponding to a carry output of said addition.

At least some examples provide an apparatus comprising:
processing circuitry to perform data processing;
instruction decoding circuitry to decode instructions to control the processing circuitry to perform the data processing;
a plurality of vector registers to store vector operands comprising a plurality of data elements; and
a plurality of predicate registers comprising a plurality of predicate fields for storing predicate values for controlling masking of operations performed by the processing circuitry; in which:
the instruction decoding circuitry is responsive to a vector add-with-carry instruction specifying a destination vector register, a first data source vector register, a second data source vector register, an input predicate register and an output predicate register, to control the processing circuitry, for a given data element of the destination vector register, to:
  update the given data element of the destination vector register with a value corresponding to a result of an addition of a first source data value obtained from a corresponding data element of the first data source vector register, a second source data value obtained from a corresponding data element of the second data source vector register, and a carry value obtained from a corresponding predicate field of the input predicate register; and update a corresponding predicate field of the output predicate register with a value corresponding to a carry output of said addition.

At least some examples provide a computer program for controlling a host processing apparatus to provide an instruction execution environment for executing instructions of target program code, the computer program comprising:

instruction decoding program logic to decode instructions of the target program code to control processing program logic to perform data processing; and a register data structure to store data representing a plurality of vector registers to store vector operands comprising a plurality of data elements, and a plurality of predicate registers to store predicate values for controlling masking of vector operations performed by the processing program logic; in which:

the instruction decoding program logic is responsive to a vector add-with-carry instruction specifying a destination vector register, a first data source vector register, a second data source vector register, an input predicate register and an output predicate register, to control the processing circuitry, for a given data element of the destination vector register, to update the register data structure to:

update the given data element of the destination vector register with a value corresponding to a result of a first source data value obtained from a corresponding data element of the first data source vector register, a second source data value obtained from a corresponding data element of the second data source vector register, and a carry value obtained from a corresponding predicate field of the input predicate register; and update a corresponding predicate field of the output predicate register with a value corresponding to a carry output of said addition.

At least some examples provide a data processing method comprising:

decoding a vector add-with-carry instruction specifying a destination vector register, a first data source vector register, a second data source vector register, an input predicate register and an output predicate register, the input predicate register and the output predicate register selected from among a plurality of predicate registers for storing predicate values for controlling masking of vector operations; and in response to decoding of the vector add-with-carry instruction, controlling processing circuitry, for a given data element of the destination vector register, to:

update the given data element of the destination vector register with a value corresponding to a result of an addition of a first source data value obtained from a corresponding data element of the first data source vector register, a second source data value obtained from a corresponding data element of the second data source vector register, and a carry value obtained from a corresponding predicate field of the input predicate register; and update a corresponding predicate field of the output predicate register with a value corresponding to a carry output of said addition.

Further aspects, features and advantages of the present technique will be apparent from the following description of examples, which is to be read in conjunction with the accompanying drawings, in which:

FIG. 1 schematically illustrates an example of a data processing apparatus supporting execution of vector instructions;

FIG. 8 shows an example sequence of instructions including the vector add-with-carry instructions shown in FIG. 3;

FIG. 9 shows a second example of an instruction sequence using the vector add-with-carry instruction;

Figure 1:
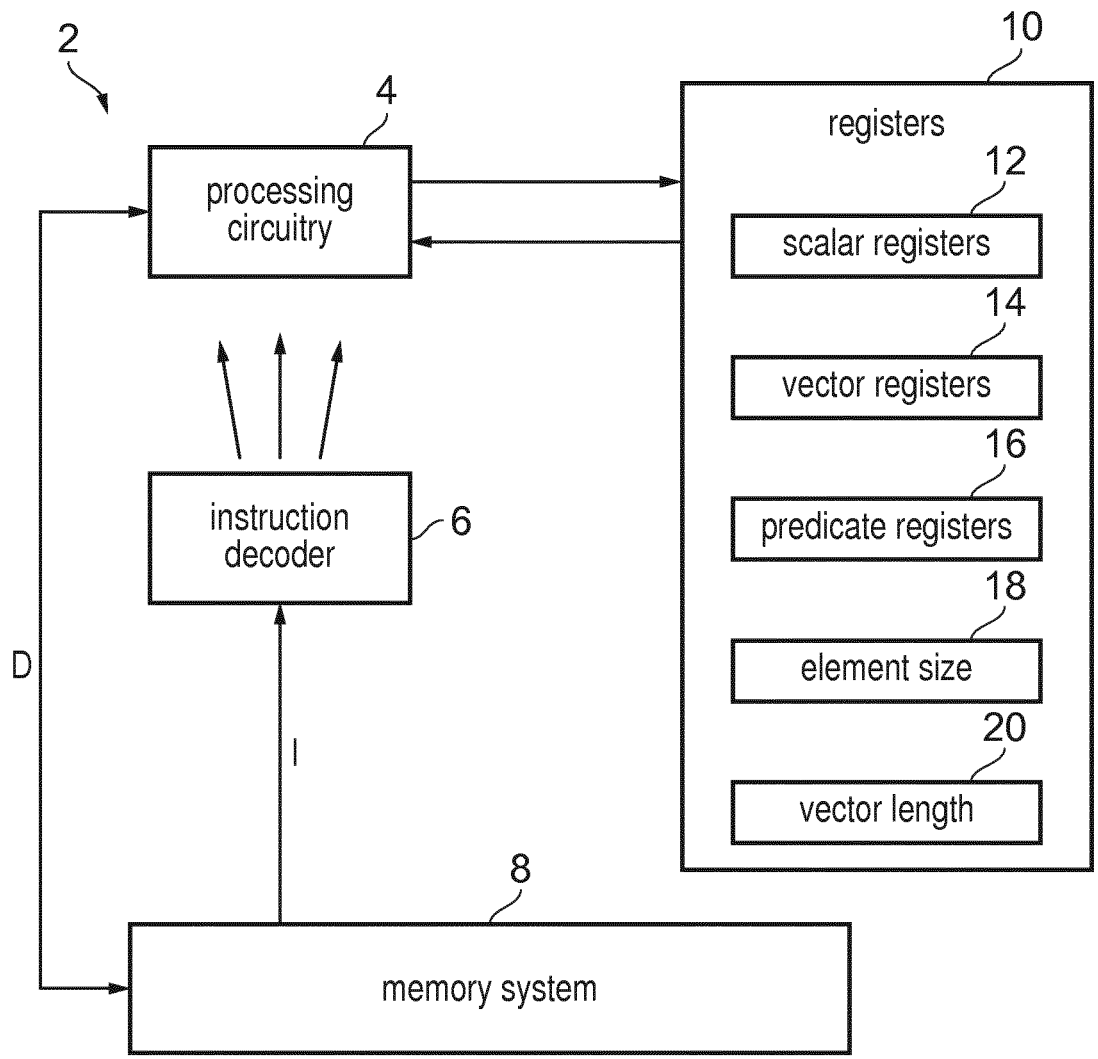

Some processing workloads may require mathematical operations to be applied to very large integer values, such as 1024-bit, 2048-bit or 4096-bit values. For example, cryptographic workloads may rely on the difficulty of factoring large numbers and so may need to multiply such large numbers in order to encrypt or decrypt messages. For example in RSA 2048, there are many successive multiplications of 2048-bit numbers to produce 4096-bit products. Some financial processing applications also require long integer values to be processed. The complexity of performing a multiplication typically would scale with the square of the number of digits, if multiplied using the standard school book approach of multiplying each digit of one operand by each digit of the other. However, some algorithms are known for reducing the complexity so that the computation overhead scales more slowly with the number of digits. For example, the Karatsuba algorithm splits long numbers to be multiplied into smaller portions to be multiplied individually, which enables a trade off of the number of multiplications required against some additional additions, subtractions or shift operations. Hence, multiplications of long integers may be decomposed into a number of smaller multiplications and a number of additions, subtractions and shifts. Vector instructions could be used to speed up such computations by mapping different sub-multiplications onto different vector lanes so that a single instruction may control the computation of parts of several independent sub-multiplications. In this case, much of the workload may effectively be incurred in performing a series of additions or subtractions of various partial products of multiplications. However, a design challenge then arises in managing the transport of carry information between partial product additions, as the carry information resulting from one addition may need to be input into the next addition performed on values of equivalent significance, and so there may be a need to retain carry information from one instruction for use as an input for another instruction.

One approach could be to effectively reduce the element size of the real data being processed within each vector lane, and reserve one or more bits at the top of each lane for storing the carry information resulting from the addition in that lane, so that it can be read by a subsequent instruction.

However, the inventors recognised that with this approach, many additional instructions may be needed for unpacking input vectors of data (which have elements completely occupying the vector lanes) and resizing those components to split them across vector lanes with a reduced effective data element size because of the need to include the additional carry information within each lane. Also, if the input data comprises a number of elements of a given element size, then when split across lanes with space reserved for carries, the same amount of input data will require a greater total number of vector lanes. For example, an input vector of 4 64-bit elements, when spread across vector lanes with 56-bits for actual data and 8 bits reserved for carries, would now require 5 lanes to be allocated to accommodate the same number of bits (256 bits) of input data, as 4 lanes of 56 bits each only provides 224 bits and so a fifth lane is needed for the last 32 bits. As the number of partial products to be calculated scales with the square of the number of components of the vector, this can significantly increase the number of multiplications and partial product additions required, which can further reduce performance.

The techniques discussed below provide techniques for implementing a vector add-with-carry instruction so that there is no need for unpacking of the input data, because the instruction can operate directly on source data elements which occupy an entire vector lane.

In one approach, the vector add-with-carry instruction specifies a destination vector register, first and second data source vector registers and a carry source vector register. At least the destination vector register and the carry source vector register each specify operands comprising at least one pair of data elements, where each pair includes a first data element and a second data element. In response to the instruction, the instruction decoder controls the processing circuitry, for each pair of data elements of the destination vector register, to update the first data element of the pair of data elements of the destination vector register with a value corresponding to a result of an addition of a first source data value obtained from a selected data element of the first data source vector register, a second source data value obtained from a selected data element of the second data source vector register, and a carry value obtained from the second data element of a corresponding pair of data elements of the carry source vector register. Also, the second data element of the pair of data elements of the destination vector register is updated with a value corresponding to a carry output of the addition.

Hence, the second data element of each pair of elements in the destination vector register is reserved for providing the carry output of the addition, and similarly the second data element of each pair within the carry source vector register is used for providing a carry input to the addition. Hence, the destination and carry source vector registers have a corresponding layout, and in practice often when these instructions are used in practice, the destination vector register resulting from one instance of the vector add-with-carry instruction may be used as the carry source vector register for a subsequent instance of the vector add-with-carry instruction.

This approach is counter-intuitive, as it effectively halves the number of data elements available for carrying the source data and the result values of the addition, which would be contrary to the usual design principle in vector processors of aiming to improve efficiency of computation by increasing utilisation of the vector register file as much as possible. That is, using half the vector lanes for providing carry values would seem to waste half the capacity of the vector processor and the vector register file, and would double the number of instructions needed to process a given number of data elements.

However, surprisingly the inventors recognised that although more add-with-carry instructions may be needed to execute a given workload, a benefit of placing carries in a second data element of each pair of elements is that the first data element can occupy the full lane size, which means no unpacking or resizing of elements from input vectors is required, and so the vector add-with-carry instruction can act directly on packed source data. In practice, for workloads involving multiplications of long integers, it has been found that, even with additional instructions being needed to compensate for the effectively reduced number of elements processed by the vector add-with-carry instruction, the overall performance is still higher due to (a) avoiding the unpacking/resizing overhead, and (b) avoiding the increase in the number of partial products caused by reducing the effective lane size with the in-lane carry approach discussed above. Hence, performance as a whole may be improved. In any case, in some micro-architectures, even though a single vector add-with-carry instruction operates on half the elements at the architectural level, two instances of instructions which in combination operate on all the elements could be "fused" together to be processed as a single microoperation by the processing pipeline, or could be processed in parallel, to avoid the apparent loss of performance caused by halving the number of elements processed per macro-instruction. This is possible for example if the micro-architecture supports multiple simultaneous writes to a result bus. Parallelism is also available in the form of independent carry-chains.

In some implementations, the destination vector register could be specified by the instruction separately from the first and second source vector registers and the carry source vector register, to provide a non-destructive instruction format which retains all the source vector in the register file after the instruction has been executed, as the result is written to a different register from all of the source registers.

However, in other implementations the first data source vector register may be the same register as the destination vector register, and for each pair, the first source data value may comprise a previous value of the first data element of the pair of data elements of the destination vector register. In practice, an accumulation operation, where the old accumulator value is added to the second source data value and carry value and written back to the same register, is useful for many workloads involving multiplication of long integers (for adding the respective partial products of a multiplication), so it is not essential for the first source data vector register to be specified independently of the destination vector register. By specifying a single register as both the destination and the first data source vector register, instruction encoding space in the instruction set architecture can be conserved for other purposes. Another advantage of a destructive instruction format (with the same register used as both destination and one of the source registers) is that, as it may sometimes be needed to limit the number of source register ports an instruction requires, and in some micro-architectures the destination register may already need to be read in the case of operations with merging predication (where predicated lanes of the destination register retain their previous value), having only two further register accesses (for the second source vector register and the carry vector register) may be beneficial.

The vector element size and/or the total length of a vector operand may vary. Some implementations could hardwire the element size and/or the vector length to a particular constant value. However other systems may support variable vector element size and vector length. For some vector element sizes or vector lengths, the vector may only contain two elements, and in this case the destination vector register and the carry source vector register could comprise a single pair of data elements, i.e. one first data element and one second data element.

However, it may be useful for the instruction decoding circuitry and the processing circuitry to support execution of at least one instance of the vector add-with-carry instruction for which the destination and carry source vector registers comprise multiple pairs of data elements, i.e. they include at least four elements (two or more of each of the first and second data elements). This enables the system to support computation of multiple additions in response to a single instruction, which can be useful for accelerating computations involving multiplications of long integer operands. For example, each pair of elements could represent an addition of partial products for a different sub-multiplication of the Karatsuba algorithm.

The mapping of the pairs of data elements onto the elements of a vector operand can be done in different ways. For example in one example the first elements of each pair could be located in one half of the register and the second elements of each pair in the other half. For example, in an example with 4 pairs of first and second elements, these could be arranged in the order 2d, 2c, 2b, 2a, 1d, 1c, 1b, 1a (where 1a is the first element corresponding to second element 2a, and so on for pairs b, c and d).

However, in one implementation each pair of data elements may comprise a pair of adjacent data elements. Hence, when the number of pairs of data elements in the destination vector register and the carry source vector register is at least two, the first data elements of the pairs may be interleaved with the second data elements of the pairs. For example, with 4 pairs of first and second elements, these could be arranged in order 2d, 1d, 2c, 1c, 2b, 1b, 2a, 1a (alternatively the order of the first and second elements in each pair could be transposed). This approach can be more efficient to implement in hardware, as it can make the hardware design more efficient since the source operands and result values to be combined in a given sub-computation of the vector instruction can be restricted to either being within the same vector lane or crossing only into the immediately adjacent vector lane, rather than requiring longer cross-lane signal paths which span two or more vector lanes. Hence, the complexity and length of wiring required can be reduced by interleaving the first and second data elements of each pair.

The carry value may be obtained from a least significant bit of the second data element of the corresponding pair of data elements of the carry source vector register. In response to the vector add-with-carry instruction, the processing circuitry may update a least significant bit of the second data element of the pair of the data elements of the destination vector register with the value corresponding to the carry output of the addition. Using the least significant bit of the second data element for providing the carry can be more efficient, as it may be adjacent to the most significant bit of the first data element of the corresponding pair, enabling the carry and data values to be written to a contiguous portion of the destination vector register. Remaining bits of the second data element other than the least significant bit may be unused in the carry source vector register and the accumulator vector register. While leaving many bits unused may appear to waste space in the vector register file and waste processing resource in the vector processing unit, as discussed above the overall performance when performing multiplications of long integers can be improved by this approach.

The vectors processed by the add-with-carry instruction may have data elements each having $2^N$ bits, and the second source data value may also comprise $2^N$ bits, where N is an integer. Hence, as the second source data value has the same size as the vector lanes themselves, corresponding to an exact power of two number of bits, the second source data value occupies an entire vector lane, and so no resizing or unpacking of data elements from an input vector or a result of an earlier vector instruction is needed in order to allow the vector add-with-carry instruction to operate on the input. Instead the vector add-with-carry instruction can operate directly on a selected element from the input vector. This is possible as the carries are retained in a separate vector element from the data result.

The second source data value may be obtained from any element of the second data source vector register. Different variants of the instructions could be provided for selecting the source data value from different elements of the second source data vector register.

In one example, the second data source vector register may provide an operand comprising at least one pair of data elements, which may be arranged in a corresponding manner to the pairs of elements in the destination and carry source vector registers. For example, the first and second data elements of each pair could be interleaved. First and second variants of the vector add-with-carry instruction can be provided. For the first variant, the second source data value may comprise the first data element of a corresponding pair of data elements of the second data source vector register (and the result of the instruction may be independent of the second element of each pair). For the second variant, the second source data value may comprise the second data element of the corresponding pair (and the result of the instruction may be independent of the first element of each pair). By providing two variants of the instruction for selecting different elements as the second source data value, this enables all the elements of an input vector to be processed without needing to perform any additional reordering or unpacking of the elements of a second source vector prior to executing the two vector add-with-carry instructions (one of each of the first/second variants), as the two variants of the instruction in combination may process each element of the second source vector.

In embodiments in which the first data source vector register is specified by the instruction separately from the destination vector register, the first source data value could similarly be extracted from either the first element of each pair (for the first variant of the instruction) or the second element of each pair (for the second variant of the instruction).

On the other hand, if the first data source vector register is the same register as the destination vector register, then for each addition the first data source value may be extracted from the first data element of the corresponding pair of elements in the destination vector register (regardless of whether the instruction variant being executed is the first variant or the second variant), as the second data element of the destination vector register would be used for representing carry information.

Also, a predicated variant of the add-with-carry instruction may be provided, which is associated with a predicate value specifying at least one predicate indication, each predicate indication corresponding to one of said at least one pair of data elements of the destination vector register. In response to the predicated variant, the instruction decoding circuitry may control the processing circuitry to perform the updates of the first/second data elements as discussed above for a pair of data elements of the destination vector register for which the corresponding predicate indication has a first value, and suppress the updates for a pair of data elements for which the corresponding predicate indication has a second value. The predicate value may be associated with the instruction either by the instruction encoding comprising a predicate register specifier identifying a predicate register storing the predicate value, or a default predicate register could be used to provide the predicate value for all instances of the predicate variant of the add-with-carry instruction regardless of the encoding of the instruction. For a pair of elements of the destination vector register for which the corresponding predicate indication has the second value, that pair of elements could retain the previous values stored in that portion of the destination vector register, or could be cleared to zero or another predetermined value. Hence, when add-with-carry instructions are predicated, rather than acting at the granularity of individual data elements of the vector, the predication may act at the granularity of pairs of data elements.

Add and subtract variants of the vector add-with-carry instruction can be provided. For an add variant, the addition comprises adding the first and second source data values and the carry value obtained from the second data element of the carry source vector register. For the subtract variant, the operation comprises a subtraction of the second source data value from the first source data value, and the carry value indicates a borrow value for the subtraction. For the subtract variant, the carry output represents a borrow output of the subtraction. Note that a subtraction can still be regarded as an addition because a subtraction of two operands is the same as an addition of the two operands when one of the operands is 2's complemented before performing the addition. Similarly, a borrow value for the subtraction can be regarded as a carry value for an addition, as the borrow value simply corresponds to a carry of −1 instead of a carry of +1 as for addition.

Where more than one variant of the vector add-with-carry instruction is provided, the variants (first/second, or add/subtract) could be distinguished in different ways. For example, different variants of the add-with-carry instruction could have different instruction opcodes. Alternatively, the variants could share a common opcode but could have another field in the instruction encoding which distinguishes the variants. In another example, different variants of the instruction could have the same instruction encoding, but could be distinguished by a mode parameter stored in a control register of the apparatus, which may be set by a preceding instruction to select which variant of the instruction should be used when a subsequent vector add-with-carry instruction is encountered. For the first/second variants, the first/second element selection could also be represented in a predicate or mask register read by the instruction.

An advantage of the form of vector add-with-carry instruction discussed above, which uses some elements of the carry source vector register and the destination vector register to transport carry information for additions/subtractions, can be that this may be relatively efficient to implement in micro-architecture, as only one register needs to be written in response to the instruction (the destination vector register). Also, in the example where an accumulator register is specified as both the destination and first source vector registers, only one destination register specifier and two vector source registers need to be specified by the instruction.

However, an alternative solution to the problem of implementing computations on large integer values can be to provide a vector add-with-carry instruction which uses predicate registers to convey the carry information. The data processing apparatus may have a number of predicate registers which include predicate fields for storing predicate values for controlling masking of operations performed by the processing circuitry. While for other types of vector instruction the predicate fields may control masking of lanes of vector processing, for the vector add-with-carry instruction, the predicate registers can be reused to represent the carry output from the addition, and the carry input to the addition may also be obtained from a predicate field of a predicate register.

Hence, the instruction decoding circuitry may respond to a vector add-with-carry instruction specifying a destination vector register, a first data source vector register, a second data source vector register, an input predicate register and an output predicate register, to control the processing circuitry, for a given data element of the destination vector register, to update the given data element of the destination vector register with a value corresponding to a result of an addition of a first source data value obtained from a corresponding data element of the first data source vector register, a second source data value obtained from a corresponding data element of the second data source vector register, and a carry value obtained from a corresponding predicate field of the input predicate register. Also, a corresponding predicate field of the output predicate register may be updated with a value corresponding to a carry output of said addition.

While this approach may require more complex micro-architecture (e.g. faster read/write paths to the predicate register file and the ability to write to both the vector register file and the predicate register file in response to the same instruction), an advantage of this approach is that the carries are not stored in elements of the destination vector register, so every element of the destination vector register can be used to store an addition result value (and every element of the first/second data source vector registers can be used as a source input), effectively doubling the number of operations which can be performed in response to a single instruction, and hence improving performance.

In summary, both the examples discussed above have the advantage that they can operate directly on complete data elements from input vectors without unpacking or resizing operations, because the carry information is not stored in the same lane as the data result, but is either stored in another lane of the vector register or within a corresponding predicate field of the predicate register. This is very useful for accelerating multiplications of long integers.

Both of the forms of instruction discussed above can be implemented in hardware using an instruction decoder which controls processing circuitry to perform the required operations in response to the vector add-with-carry instruction. For example, the instruction decoder may comprise logic gates for interpreting the encoding of the vector add-with-carry instruction, to selectively activate the appropriate control signal paths for controlling the processing circuitry to update the result registers based on the inputs as discussed above.

However, the technique can also be implemented in a simulation of a processor architecture, rather than in physical hardware. Hence, a simulator computer program may be provided for controlling a host processing apparatus (which may not itself support the instructions discussed above) to provide an instruction execution environment for executing instructions of target program code so as to simulate execution of the target program code on a target processing apparatus which does support those instructions. The functions of the instruction decoder and processing circuitry could be performed instead by instruction decoding program logic and processing program logic in the simulator program, and the registers could be implemented as a simulated register data structure in memory which stores the data representing the registers of the simulated target processing apparatus. The computer program may be stored as on a storage medium. The storage medium may be a non-transitory storage medium.

FIG. 1 schematically illustrates an example of a data processing apparatus 2 having processing circuitry 4 for performing data processing operations in response to instructions decoded by an instruction decoder 6. The program instructions are fetched from a memory system 8, which may include one or more caches and memory. The instructions are decoded by the instruction decoder 6 to generate control signals which control the processing circuitry 4 to process the instructions to perform the corresponding operations defined by an instruction set architecture. For example the decoder 6 may include logic gates for interpreting the opcodes and any additional control fields of the instructions to generate control signals which cause the processing circuitry 4 to activate appropriate hardware units for performing operations such as arithmetic operations, logical operations, or load/store operations. Registers 10 store data values to be processed by the processing circuitry 4 in response to instructions, and control information for configuring the operation of the processing circuitry. In response to arithmetic or logical instructions, the processing circuitry 4 reads operands from the registers 10 and writes results of the instructions back to the registers 10. In response to load/store instructions, data values are transferred between the registers 10 and the memory system 8 via the processing logic 4.

The registers 10 include a scalar register file 12 comprising a number of scalar registers for storing scalar values which comprise a single data element. The scalar registers could include integer registers for storing integer operands, and floating point registers for storing floating point values. Alternatively integer and floating point values could be stored in the same set of registers. Some instructions supported by the instruction decoder 6 in the instruction set architecture are scalar instructions which control the processing circuitry 4 to process scalar operands read from the scalar registers 12 to generate a scalar result to be written back to a scalar register 12.

The registers also include a vector register file 14 and a predicate register file 16. The vector register file 14 includes a number of vector registers which support storage of a vector operand comprising multiple data elements. The instruction decoder 6 supports vector instructions which control the processing circuitry 4 to perform a number of lanes of vector processing on respective elements of a vector operand read from the vector registers, to generate either a scalar result to be written to the scalar registers 12 or a further vector result to be written to a vector register 14. Some vector instructions may also generate a vector result from one or more scalar operands, or may perform an additional scalar operation on a scalar operand in the scalar register file as well as vector processing on operands read from the vector register file. Hence it is possible for some instructions to be mixed-scalar-and-vector instructions. As well as vector arithmetic or logical instructions which trigger arithmetic or logical operations within the processing circuitry, the decoder 6 may also support vector load/store instructions which may transfer data between the vector registers 14 and the memory system 8.

Figure 2:
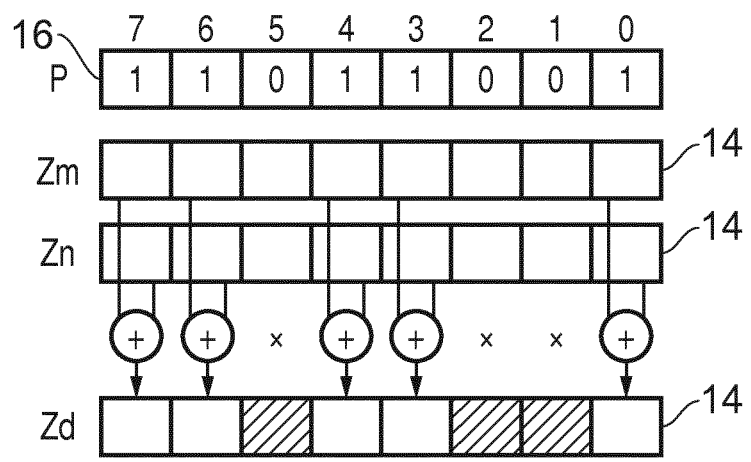
FIG. 2 shows an example of a vector operation with predication.

FIG. 2 shows an example of a vector operation controlled by predicate information in one of the predicate registers 16. In this example the vector instruction is a vector add instruction, which controls the processing circuitry 4 to perform a number of independent add operations, each adding pairs of corresponding data elements of two input vectors Zm, Zn and writing the result of the addition to a corresponding element of a destination vector Zd. Of course, other arithmetic or logical operations could be applied as the core operation to be performed in each vector lane, not just add. Each predicate field of a predicate register P controls whether the corresponding element of the destination register is updated with the result of the addition. For example, in this example the vector lanes 1, 2 and 5 are masked (as the corresponding predicate fields for those lanes are 0), and so the corresponding elements of the destination register Zd are not set to the result of the addition. The masked lanes could retain their previous values, for example. Alternatively, a clearing/zeroing form of predication may clear the masked elements of the destination register to zero or another predetermined value, while the non-masked lanes are written with the result of the addition in that lane. Hence in general the predicate registers 16 may be used for controlling masking of vector operations in particular lanes. For example, a conditional vector instruction could perform a comparison to test whether input elements in each lane of a given vector meet some condition, and set the predicate values in a predicate register based on the comparison result in the corresponding lane, and then a subsequent vector instruction can be masked depending on the predicates so that the effects of that instruction in each vector lane are made conditional on the comparison performed by the earlier conditional vector instruction.

While FIG. 2 shows all of the additions being performed in parallel for a given vector this is not essential. The processing circuitry 4 may support processing of vectors with a range of different data element sizes and different vector lengths. For example a 256-bit vector register 14 could be partitioned into 32 8-bit data elements, 16 16-bit data elements, 8 32-bit data elements, 4 64-bit data elements, or 2 128-bit data elements for example, or could be interpreted as a single 256-bit element. Also, vector registers of different sizes, e.g. 128, 256 or 512 bits, may be supported. For example the vector register bank 14 could be partitionable in different ways, to provide different vector register sizes (e.g. several physical registers of fixed size could be combined and operated upon by a single vector instruction, to represent a larger register size). Hence, as shown in FIG. 1, the registers 10 may also include control information for controlling the vector processing, such as an element size parameter 18 specifying the data element size to be used for the vector operation (number of bits in one data element of the vector), and a vector length parameter 20 specifying the length of the vector register (total number of bits in the vector, including all elements). In some implementations these values could be hard wired so that they are always the same for all instructions. It can still be useful to provide registers specifying the element size 18 and the vector length 20 so that code written for execution on a range of platforms with different element sizes or vector lengths can read the particular element size or vector length implemented on the system which is currently executing that code. However, in other examples the element size and or the vector length may be programmable so that instructions may specify what element size or vector length to use for a given operation. Alternatively, the element size and/or vector length could be specified by the vector instruction encoding, rather than a parameter within a control register.

Hence, the element size or vector length may vary. Depending on the particular sizes selected, the vector processing circuitry may not always have enough processing hardware to process the entire vector in parallel. If the processing logic is narrower than the vector length being used for a given operation, then the vector could be processed in multiple cycles, in separate passes through narrower processing logic. Hence, while the vector instruction may trigger the processing circuitry 4 to perform operations in multiple lanes of processing in response to a single instruction, this does not necessarily imply that all of those lanes must be processed in parallel. At one extreme, some vector implementations could only provide processing logic corresponding to a single lane, and then process all of the vector lanes sequentially. At the other extreme, higher performance implementations could process all the vector lanes in parallel using a number of parallel execution units. Other implementations may process several lanes in parallel, but process the vector as a whole in multiple sequential chunks.

It will be appreciated that the element size and vector length indications 18, 20 are just some examples of control information that can be stored in the registers 10. Other examples may include a program counter register for indicating an address of an instruction representing the current point of execution, a stack pointer register indicating an address of a location in memory 8 of a stack data structure for saving or restoring state when handling exceptions, and a link register for storing a function return address to which processing is to branch to following execution of a function.

Figure 3:
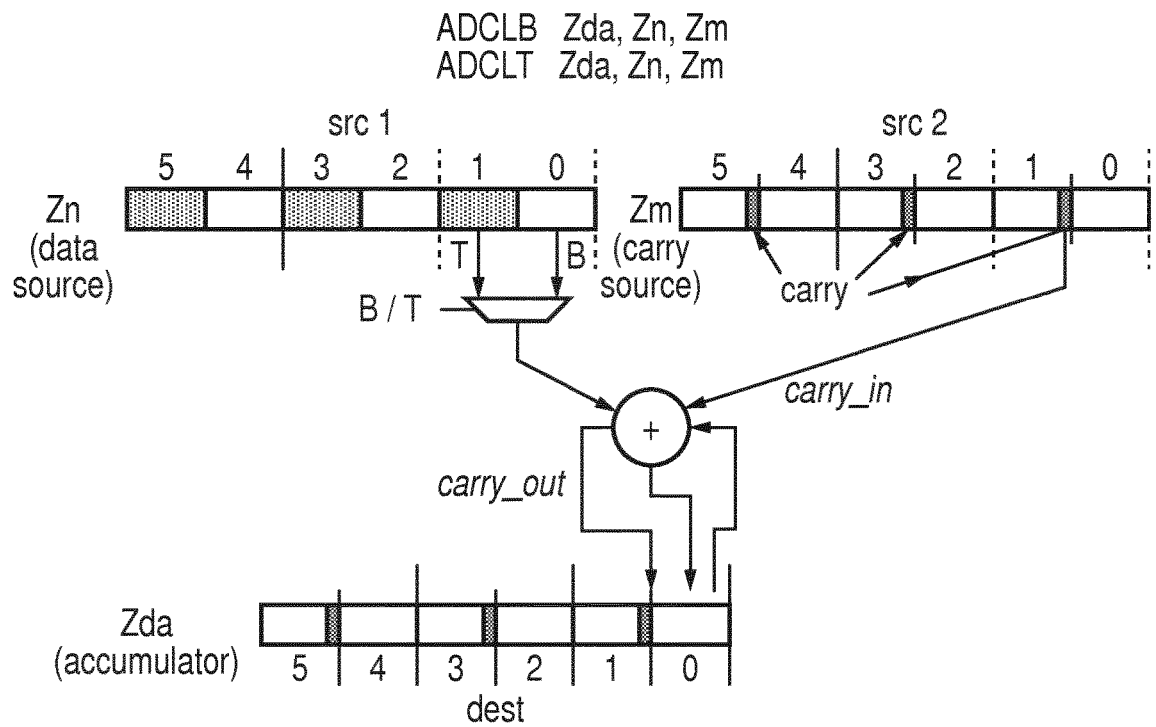
FIGS. 3 and 4 show add and subtract variants of a vector add-with-carry instruction according to a first example.
Figure 4:
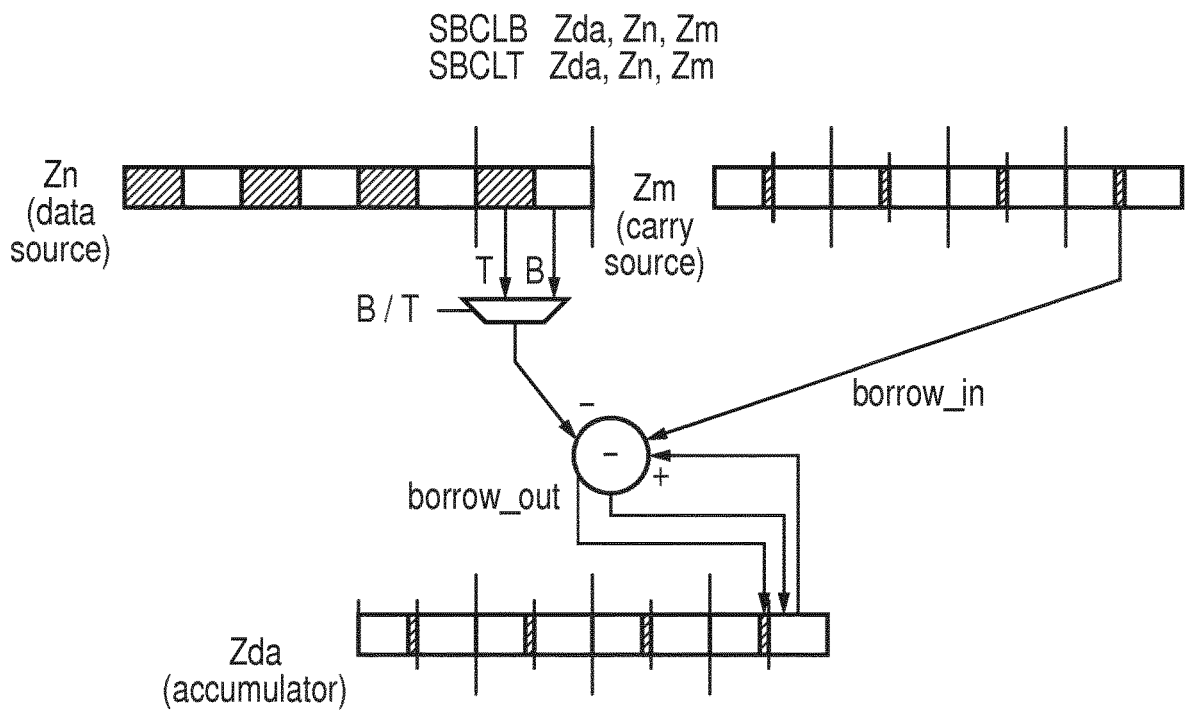

FIGS. 3 and 4 show add and subtract variants of a vector add-with-carry instruction according to one example. For both of the add and subtract variants, further first and second variants of the instruction are shown:

ADCLB Zda, Zn, Zm //Add with carry long (bottom)—first variant, add variant
ADCLT Zda, Zn, Zm //Add with carry long (top)—second variant, add variant
SBCLB Zda, Zn, Zm //Subtract with carry long (bottom)— first variant, subtract variant
SBCLT Zda, Zn, Zm //Subtract with carry long (top)— second variant, subtract variant For each variant, Zda represents the destination vector register (which also acts as a first source data vector register, and can be referred to as the accumulator vector register), Zn represents the second source data vector register, and Zm represents the carry source vector data register. These instructions can be used for accelerating the processing of large integers by performing additions or subtractions such that the carry or borrow input information is interleaved with the actual data values in the accumulator vector register and carry source vector register.

Hence, the carry information is an integral part of the source and destination vector registers. It is useful to constrain the positions of the "carry" (or "borrow") information within the source and destination vectors to lanes adjacent to those performing the mathematical operation which utilises the "carry" as an input or from which the "carry" is generated. See FIGS. 3 and 4 where the registers Zda, Zn, Zm are divided into pairs of elements. Each pair comprises a "bottom" element (first element) corresponding to an even-numbered element and a "top" element (second element) corresponding to an odd-numbered element. For registers Zda, Zm the carry information is located in the top elements of each pair, while the bottom elements provide the corresponding data. While other examples could arrange the data/carry elements of each pair differently (e.g. with all the data elements in one half of the register and the corresponding carry elements in the other half), interleaving the data and carry elements can be more efficient because the inputs for generating an adjacent pair of elements in Zda are selected from a corresponding pair of elements of Zn, Zm, avoiding any need for longer cross-element paths which span across 2 or more elements of the vector, which can make the micro-architectural implementation of the processing circuitry more efficient. Hence, these operations effectively partition each vector into "granules" or segments whose size is twice that of the vector elements.

FIG. 3 shows the operation of the ADCLB and ADCLT instructions. For clarity, we illustrate the detailed operation of only one "granule" (pair of adjacent top and bottom elements). It will be appreciated that a corresponding operation is performed for each other granule (pair of elements). The ADCLB instruction adds the even-numbered elements B of one source Zn (or the odd-numbered elements T in the case of the ADCLT variant) to the even-numbered elements of the destination vector register, using the least significant bit of the top half of each granule (odd-numbered element) in the second source Zm as carry input. The resulting sum is written to the bottom half of each granule in the destination vector while the carry information generated is written to the least significant bit of the top half of each granule in the destination. The remaining bits of the top half of each granule in Zda remain unused. The result is independent of the bits of the bottom (even-numbered) element of each granule in the carry source register Zm. Also, for ADCLB the result is independent of the non-selected (top/odd-numbered) elements of the data source register Zn, and for ADCLT, the result is independent of the non-selected (bottom/even-numbered) elements of Zn.

By interleaving carry information and the input or result data in this manner, we can ensure that the carry-chain is part of the regular dataflow. This enables several degrees of parallelism. Firstly, there can be more than one carry-chain pending simultaneously since dependencies are resolved at the granularity of vector registers. Secondly, B/T variants of the instruction can be computed independently (and in some micro-architectures, concurrently if the B/T variants can be fused into a single micro-operation or if the two variants can be processed in parallel by the pipeline). Since the ADCL instructions typically consume the partial products generated by preceding multiplication steps, these instructions make it possible to design a program sequence so that the multiplication and addition steps are "streamlined" and there are no extra operations for handling the carries because they are essentially bound to the accumulators. This reduces the overhead of marshalling carry information.

While in FIGS. 3 and 4 the "first element" of each pair of elements is at the lower element position than the second element, so that the result is written to the bottom element of each pair, in other implementations the first and second elements could be transposed within the registers so that the result updates the top element of each pair and the carries are written to the bottom element. However, it may be more efficient in micro-architecture to have the carry provided at the more significant element of each pair, as this may correspond with the ordering in which the bits may be output by an adder circuit, as the carry represents one bit position more significant than the most significant bit of the data result of the addition.

FIG. 4 shows corresponding processing of the first/second variants of the subtract variant of the vector add-with-carry instruction. The operation or dataflow of the SBCLB and SBCLT instructions is similar to ADCLB and ADCLT respectively, except that the core operation is a "subtraction" (i.e. the same addition but the element selected from Zn is 2's complemented prior to the addition), and "borrow" information is used as input and generated at the output instead of "carry" information (the borrow represents a carry of −1). Both the 2's complementing of the data input from Zn and the borrow inversion can be implemented simply by inverting both the Zn data source input and the borrow_in value to the adder. No separate addition of 1 to the Zn data source input is required as the inversion of the borrow_in value effectively provides this. With a borrow value of 0, the inverted borrow_in value of 1 provides the addition of 1 for the 2's complement and no borrow is required. With a borrow value of 1, the inverted borrow_in of 0 reflects that the subtraction of 1 for the borrow cancels out the addition of 1 for the 2's complement. Hence, once both the data input and borrow_in value have been inverted, the addition can be performed in the same way as for the add variant.

Figures 4A, 7:
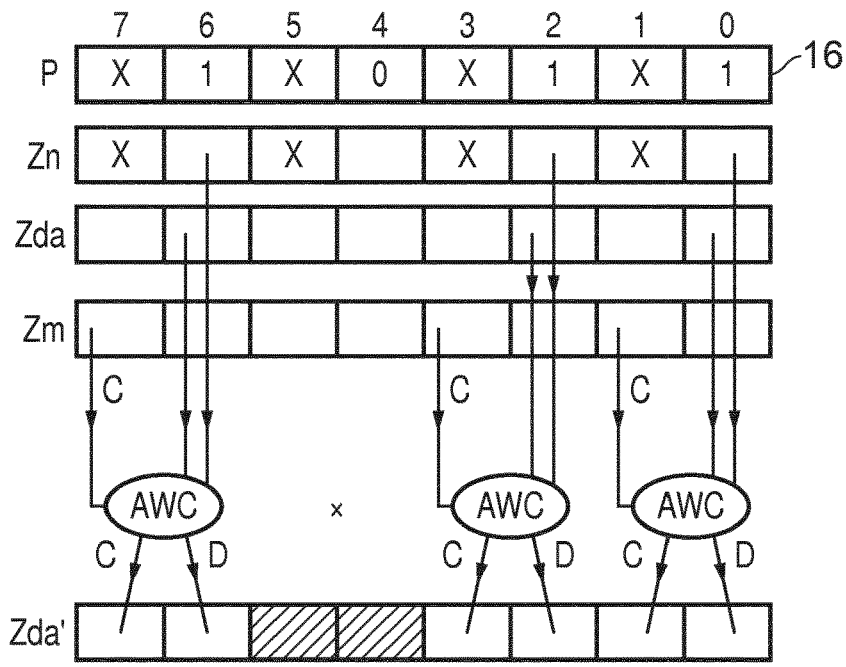
FIG. 4A shows a predicated variant of the vector add-with-carry instruction.
FIG. 7 shows an example of partial products to be added when performing a multiplication of two 256-bit values, using a vector element size of 64 bits.

FIG. 4A shows an example of a predicated variant of the vector add-with-carry instruction. In this example, the predication is applied to the ADCLB variant shown in FIG. 3, but similar predicated versions of the ADCLT, SBCLB and SBCLT variants could also be provided. The core add-with-carry operation performed for each pair of adjacent top/bottom elements of the destination register Zda is the same as in FIG. 3. However, the instruction also is associated with a predicate value P, e.g. stored in one of the predicate registers 16. The predicate value includes a number of predicate fields similar to that of FIG. 2, but for the vector add-with-carry instructions of the type shown in FIGS. 3 and 4, only half the predicate fields are valid as the predication is applied at the granularity of pairs of adjacent elements, rather than for each element. In this example, the valid predicate fields are those corresponding to the bottom (even-numbered) elements of each pair (and so the result is independent of the predicate fields corresponding to the top elements of each pair, which are marked with an X to indicate that the values of these fields do not affect the result). However, other implementations could choose to use the top (odd-numbered) predicate fields for each pair of elements as the valid predicate field.

For pairs of elements of the destination vector for which the corresponding predicate indication is 1, the add-with-carry operation is performed in the same way as shown in FIG. 3, to update the first element of the pair with the data D resulting from the addition, and the second element of the pair with the carry output C of the addition. However, for a pair of elements for which the corresponding predicate indication is 0 (as shown for elements 4 and 5 in this example, the updates of those elements of the destination vector Zda' is suppressed. Instead, these elements of the destination vector Zda' may retain their previous value (merging predication) or may be cleared to zero or another predetermined value (zeroing predication). Hence, predicates apply to each granule (pair of elements) rather than to each individual element. It will be appreciated that FIG. 4A shows one example format of the predicate register 16, but any other technique for providing predicate indications indicating whether each pair of elements of the destination register Zda' should be masked may also be used.

Figure 5:
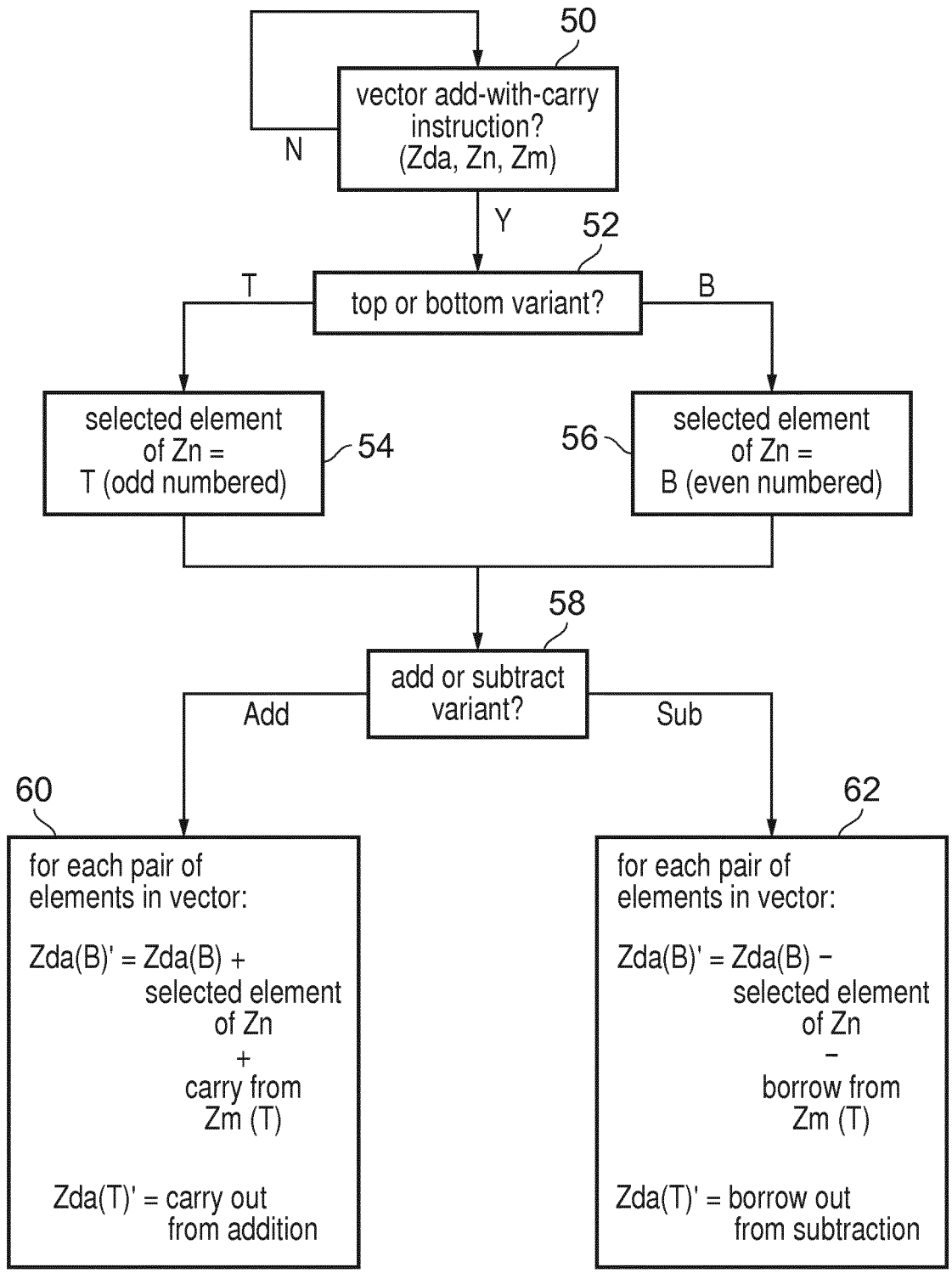
FIG. 5 is a flow diagram showing a method of processing the vector add-with-carry instruction.

FIG. 5 is a flow diagram showing the processing of a vector add carry instruction, which specifies a destination (accumulator) vector register Zda, a second data source vector register Zn and a carry source vector register Zm (in this example the destination vector register Zda also serves as first data source vector register). At step 50, the instruction decoder determines whether such a vector add-with-carry instruction has been detected and if not then the current instruction is processed according to the operation represented by that instruction. When a vector add-with-carry instruction is encountered then at step 52 the instruction decoder determines whether the instruction is of the "top" (second) or "bottom" (first) variant. If the instruction is the top variant, then at step 54 the selected element from each pair of elements in the second data source vector register Zn will be the top element of the pair, that is the odd-numbered element (second element), while if the instruction is the bottom (first) variant, then at step 56 the bottom (first or even-numbered) element of each pair is selected from the second data source vector register Zn.

At step 58 the instruction decoder determines whether the instruction is of the add variant or of the subtract variant. If the instruction is the add variant, then at step 60, for each pair of elements in the destination vector register Zda, a new value of the bottom (first) element of the pair, Zda(B)', is set to the result of an addition of: (i) the previous value of the bottom element Zda(B) of that pair of elements in the destination vector register, (ii) the selected element (top or bottom) of the corresponding pair of elements in the second data source register Zn as selected at step 54 or 56, and (iii) a carry input which is extracted from the top element Zm(T) of a corresponding pair of elements in the carry source vector register Zm. Also, the least significant bit of the top element Zda(T)' of the corresponding pair of elements in the destination vector register Zda is set to the carry output of the addition.

If the instruction is the subtract variant, then at step 62 the bottom element of each pair of elements in the destination vector register, Zda(B)', is set to the result of the previous value of that bottom element, Zda(B), minus the one of the corresponding pair of elements in the data source vector Zn that was selected at step 54 or 56, minus a borrow value represented by the carry value extracted from the top element Zm(T) of the corresponding pair of elements in the carry source vector register source Zm. Also, the least significant bit of the top element Zda(T)' of the corresponding pair or elements of the destination vector register is set to the borrow output from the subtraction (i.e. the lsb of Zda(T) is set to the value output on the carry output of the adder circuit performing the subtraction).

While the examples of FIGS. 3-5 show destructive instruction formats where the same register Zda acts as both the destination register and the first data source register, a non-destructive instruction format which specifies a further vector register as the first data source register, separate from the destination register, can also be provided to avoid overwriting the first source vector when writing the result to the destination register.

An example use case for these instructions is discussed below.

The most time-consuming portion of several important cryptographic workloads involves routines which perform mathematical operations on large integer values. In addition to cryptographic scenarios, mathematical operations involving big numbers underpin libraries such as the GNU Multiprecision Arithmetic (GMP) library which is used in financial software and some scientific applications. Such numbers are typically used in instances where floating-point arithmetic is unsuitable (despite its range) due to concerns about reproducibility or mathematical rigour. The RSA algorithm is the most commonly used public-key cryptographic algorithm. Its security relies on the perceived difficulty of factoring large numbers. In order to encrypt or decrypt messages, there is a requirement for the processor to multiply large numbers as quickly as possible in a technique known as modular exponentiation. For example, in RSA2048, there are many successive multiplications of 2048 bit numbers delivering 4096 bit products which are then reduced.

The most straightforward method of multiplying integers (which is commonly referred to as the "schoolbook" method) requires $O(n^2)$ steps for n-digit sources since every digit in one source needs to multiply every digit in the other source. There are also "addition" and "data realignment" (shift) operations required as can be seen in the following example:

111*543=333+(444<<1 digit)+(555<<2 digits)=60273

Figure 6:
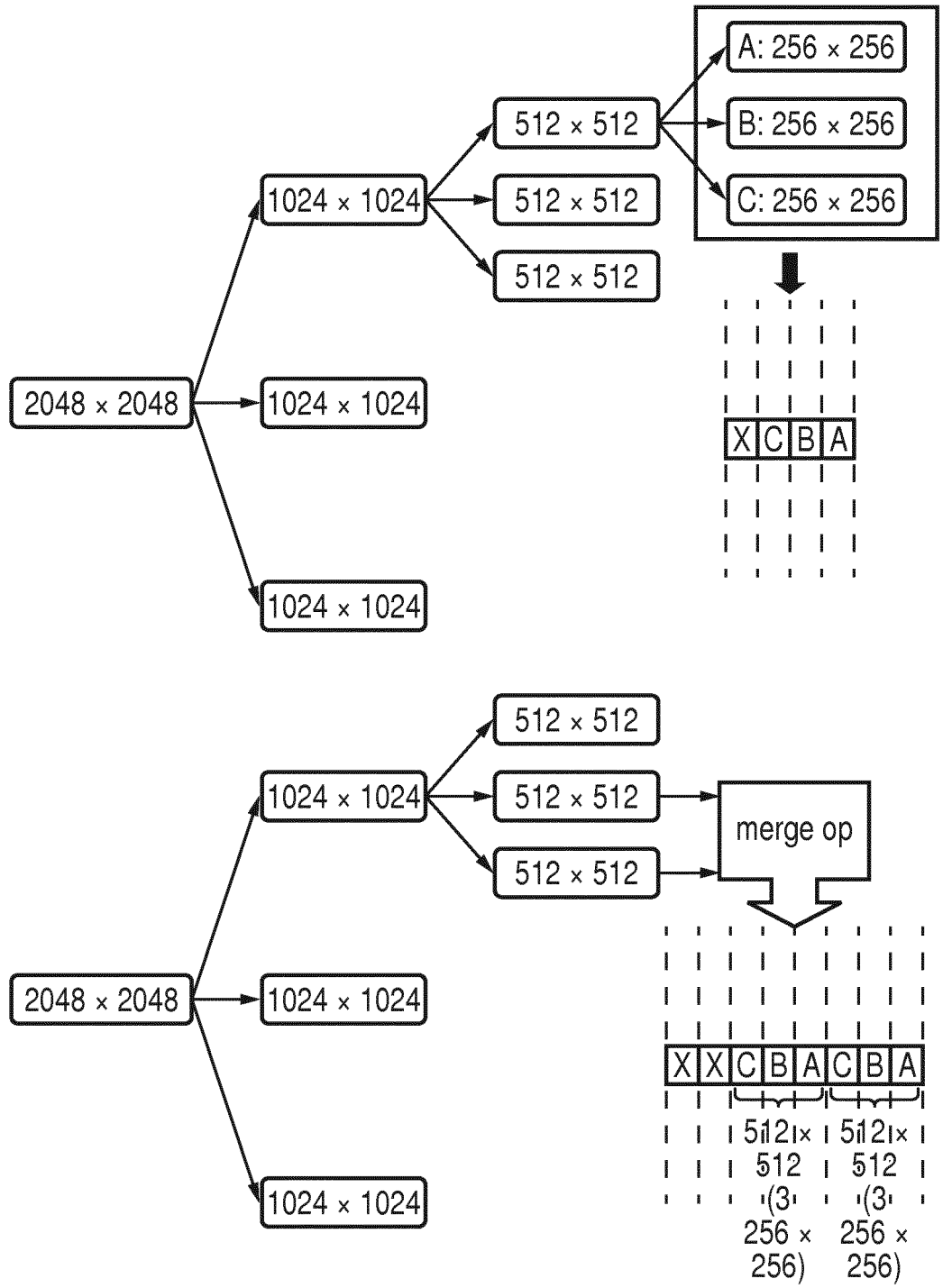
FIG. 6 shows an example of vectorisation of multiplication of long integer values according to the Karatsuba algorithm.

However, the Karatsuba algorithm can reduce the multiplication of two n-digit numbers to at most $O(n^{log_2 3})$ single-digit multiplications by using a divide-and-conquer-based approach. This method employs a trade-off between "multiplications" and "additions", "subtractions", etc., and yields an appreciable performance advantage when "n" is large. Each multiplication with input operands of size "n" is broken up into a number of smaller multiplications with input operands of size "n/2" and some auxiliary operations—"additions", "subtractions" etc. Formally, one can write the expression for multiplying two n-bit integers, A and B, to generate a 2n-bit result C, as shown in the equations at the top of FIG. 6. Note that in this example we use the subtractive variant of the Karatsuba algorithm in order to ensure that the partial products do not have unwieldy sizes. Hence, a multiplication of two 2048-bit integers can be decomposed into three sub-multiplications of 1024-bit integers, as shown in FIG. 6. Each 1024-bit multiplication can itself be decomposed in the same way into three 512-bit integer multiplications. Each 512-bit multiplication can then be further decomposed into three 256-bit integer multiplications. Eventually a point is reached where decomposing the multiplication further would result in a greater total overhead due to the additional additions, subtractions or shifts needed to recompose the overall result.

Since the sub-multiplications are independent, with appropriate data layout and orchestration, it is possible to vectorise the Karatsuba algorithm as shown in FIG. 6. For example, it the leaf node of the Karatsuba tree provides 256-bit sub-multiplications, each of the three 256-bit sub-multiplications of a given branch of the Karatsuba tree could be allocated to a separate lane A, B, C of a vector as shown in the upper example of FIG. 6. Also, with a larger vector, 6 256-bit sub-multiplications for different 512×512-bit multiplications at a higher level of the Karatsuba tree could be allocated to 6 lanes of an 8-element vector (each set of three lanes A, B, C representing the three 256×256-bit multiplications of the corresponding 512-bit node), as shown in the lower example of FIG. 6.

For example, if we choose an element size of 64 bits then we can multiply two 256-bit integers A and B as follows: A×B={$a_3$, $a_2$, $a_1$, $a_0$}×{$b_3$, $b_2$, $b_1$, $b_0$}. The partial products pertaining to this multiplication are depicted in FIG. 7. Note that the products are staggered from right to left because each partial product needs to be "realigned" so it is accumulated in the appropriate column.

FIG. 8 shows a code sequence representing one possible instance of a sequence of instructions necessary in order to perform the computation of the second "limb" in FIG. 7 for computing the partial products $a_1$×{$b_3$, $b_2$, $b_1$, $b_0$}. It begins with some multiplications in order to generate the low and high 64-bit parts of the various partial products. Note that each instance of the 256-bit-by-256-bit multiplication occupies a single lane in the vector processing and the 64-bit components of each 256-bit operand are laid out vertically (in separate registers acted upon by separate instructions), rather than across each vector. This implies that in order to generate the partial products for the calculation: $a_1$×{$b_3$, $b_2$, $b_1$, $b_0$}, the register z1 (which contains $a_1$ from different source operands) needs to be multiplied with each of z4 (providing $b_0$ from a number of different source operands), z5 ($b_1$), z6 ($b_2$) and z7 ($b_3$) (lines 1 to 8 in FIG. 8).

In FIG. 8, the adclb and adclt instructions are used to add the partial products into the accumulator for each lane: zacc1LB, zacc1LT, zacc0HB, etc. Corresponding pairs of adclb and adclt instructions are executed to act on even- and odd-numbered elements of the partial products from the multiplications respectively. The instructions are used in a manner which exposes 4-way parallelism: the B & T variants are independent and can be advantageously scheduled as a result. In addition, there are two carry-chains which are capable of being processed simultaneously. One carry-chain starts on line 10 and the other starts on line 12. We can then trace the first carry-chain for the "B" variants through the instructions on lines 14, 18 and 26. The second carry-chain can be traced through instructions at lines 16, 20 and 29. Similar chains exist for the "T" variants. The instructions at line 32 and 33 are used to merge the previously independent carry-chains while adding the last partial product ($a_1$×$b_3$(H)) into the accumulator at the same time.

FIGS. 9 and 10A to 10I show another example of use of the vector add-with-carry instructions. FIG. 9 shows an example instruction sequence of ADCLB instructions for performing the addition of partial products of a multiplication {$a_3$, $a_2$, $a_1$, $a_0$}×$b_i$ which represent a single limb of a larger multiplication which may be part of the Karatsuba tree of multiplications for multiplying large integers. It is assumed in FIG. 9 that the partial products have already been generated and stored in vector registers $P_0$lo, $P_1$lo . . . , $P_3$hu (where $P_{ji}$lo and $P_{ji}$hi represent the lower and upper halves of the product of $a_j$ and $b_i$). AccB[i] to AccB[i+4] represent 5 accumulator registers for storing the 5 portions of the product {$a_3$, $a_2$, $a_1$, $a_0$}×$b_i$ shown in columns 0 to 4 respectively. Each pair of vector lanes represents an entirely independent computation applied to different input values compared to other vector lanes—hence each of the additions of partial products required for a given computation of the type shown in FIG. 7 is performed within a single pair of lanes by the sequence of instructions of FIG. 9 (e.g. the calculation in each pair of lanes corresponding to a different node of the Karatsuba tree). For conciseness, FIGS. 10A to 10I only show the ADCLB instructions which act on even-numbered lanes of the vectors—corresponding ADCLT instructions not shown could be executed to act on the odd-numbered lanes. For clarity, the two independent carry chains are distinguished by showing carries of the first chain without an asterisk (e.g. $C_{AccBi}$) and carries of the second chain with an asterisk (e.g. $C_{AccBi}$*).

Figure 10A:
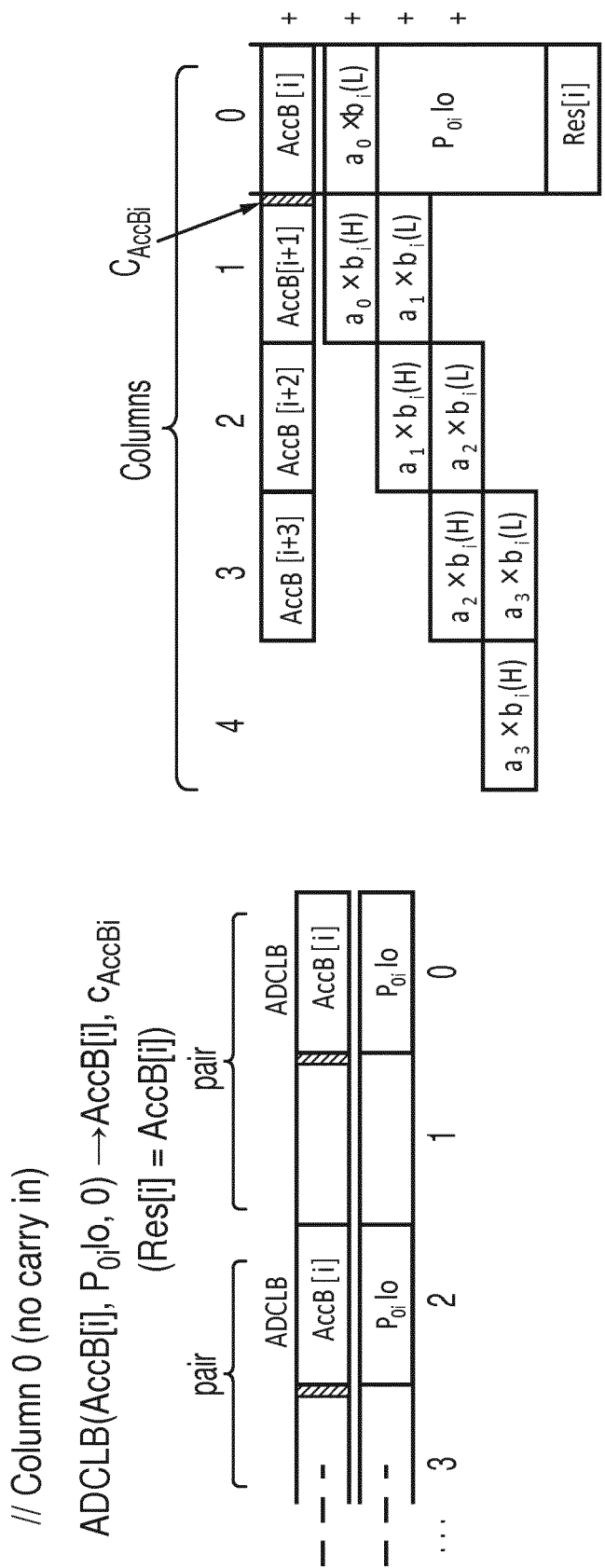
FIGS. 10A to 10I shows a series of diagrams illustrating the processing of the instruction sequence of FIG. 9.

FIG. 10A: AccB[i] represents the accumulation in column 0. For each pair of elements in AccB[i], the lower (even-numbered) element of the pair is set to the sum of: the previous value of the lower element in AccB[i], the bottom element of the corresponding element pair in $P_0$lo, and 0 as a carry input (as this is the least significant portion of the result and so no carry from a lower addition is needed). The addition result already represents the end result value Res[i] for this portion of the result as no further carry can be injected into the least significant portion of the result. The carry output $C_{accBi}$ from the addition is written to the least significant bit of the top element of the pair in AccB[i], and represents a carry bit having significance equivalent to the least significant bit of column 1.

Figure 10B:
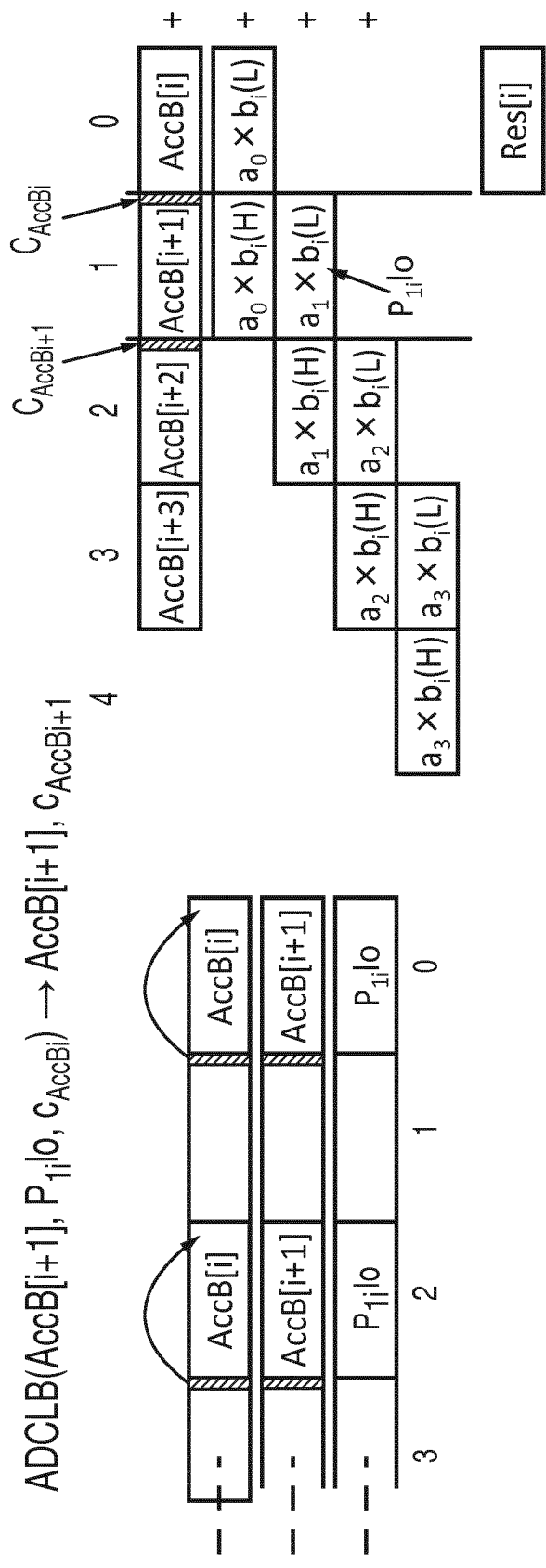

FIG. 10B: AccB[i+1] represents the accumulation in column 1. For each pair of elements in AccB[i+1], the lower (even-numbered) element of the pair is set to the sum of: the previous value of the lower element in AccB[i+1], the bottom element of the corresponding element pair in $P_1$lo, and $C_{accBi}$ as a carry input. That is, the destination register AccB[i] of the previous ADCLB instruction is specified as the carry source vector register of the next ADCLB instruction, so that the carry $C_{accBi}$ generated in the previous addition in column 0 is input as the carry input for the addition in column 1. The carry output $C_{accBi+1}$ from the column 1 accumulation is stored in the least significant bit of the top element of each pair in AccB[i+1], to represent a carry to be applied to the least significant bit of an accumulation in column 2.

Figure 10C:
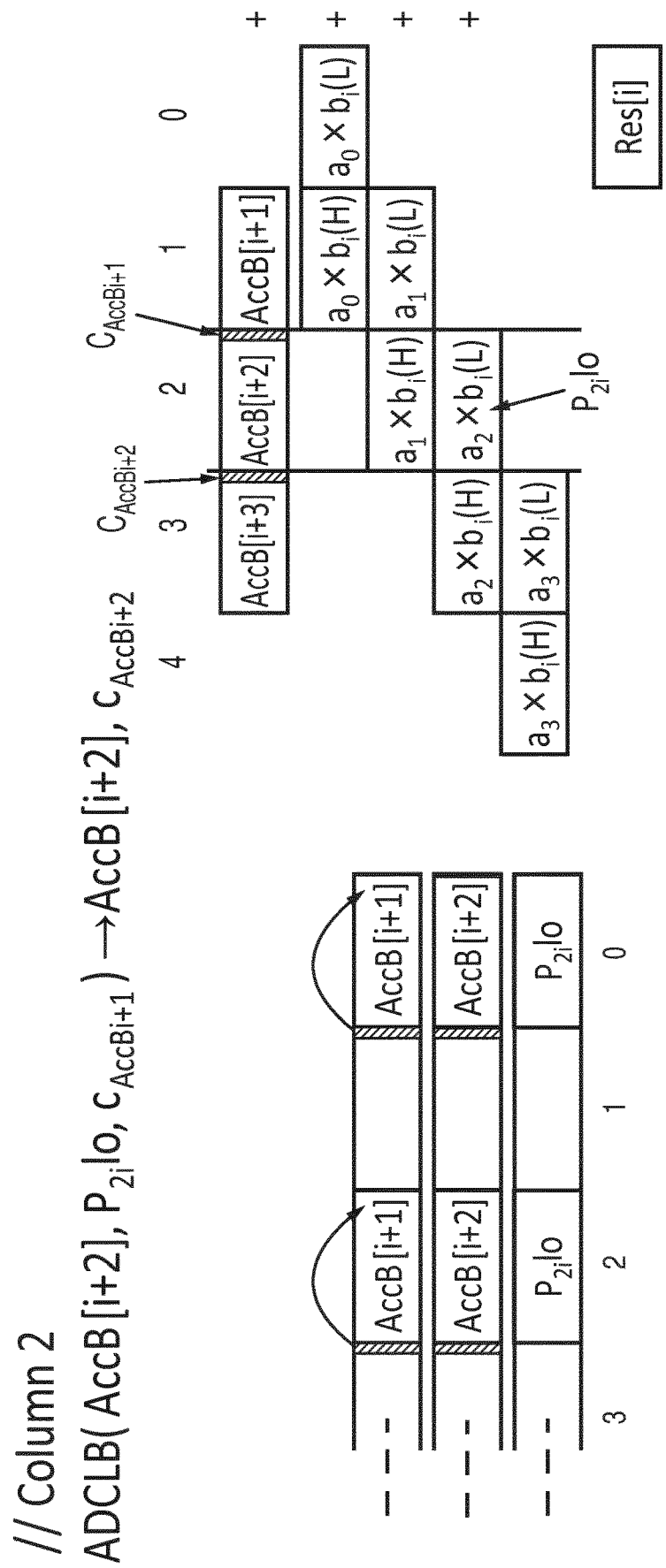

FIG. 10C: AccB[i+2] represents the accumulation in column 2. Again, the result vector AccB[i+1] for the previous instruction becomes the carry source vector register for the next instruction, so that for each pair of elements, the carry $C_{accBi+1}$ generated by the previous addition in column 1 is extracted from the top element of the corresponding pair in AccB[i+1] and added into the accumulation of AccB[i+2] and $P_2$lo which is written to the bottom of element of the pair in AccB[i+2], and the resulting carry output $C_{accBi+2}$ is stored in the top element of each pair of elements in AccB[i+2].

Figure 10D:
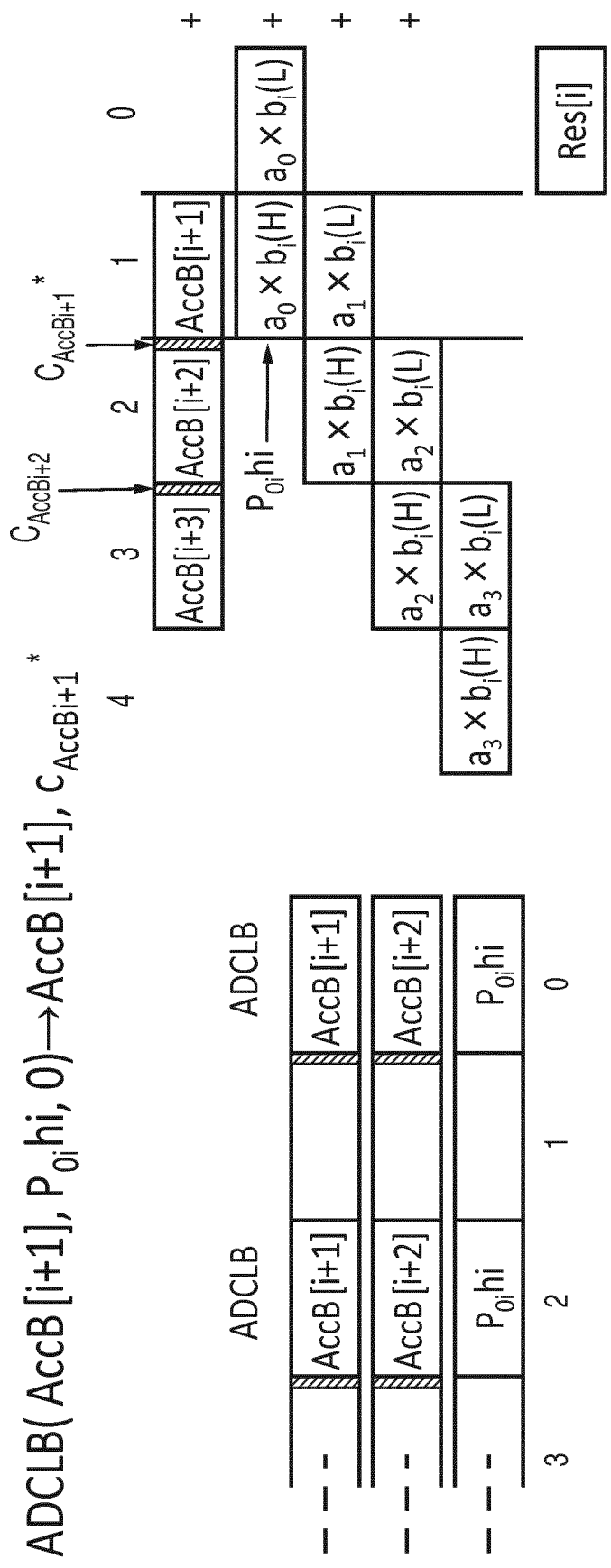

FIG. 10D: this instruction marks the start of a second carry chain, independent of the chain of carries taken through FIGS. 10A-10C. This instruction represents the addition in column 1 of the partial product $P_0$hi to AccB[i+1] resulting from FIG. 10B. Note that the carry value in the odd-numbered elements of AccB[i+1] have already been consumed in FIG. 10C, so can be overwritten in the odd-numbered elements by the new carry values $C_{accBi+1}$* resulting from each addition of the even-numbered elements of AccB[i+1] and the even-numbered elements of $P_0$hi.

Figure 10E:
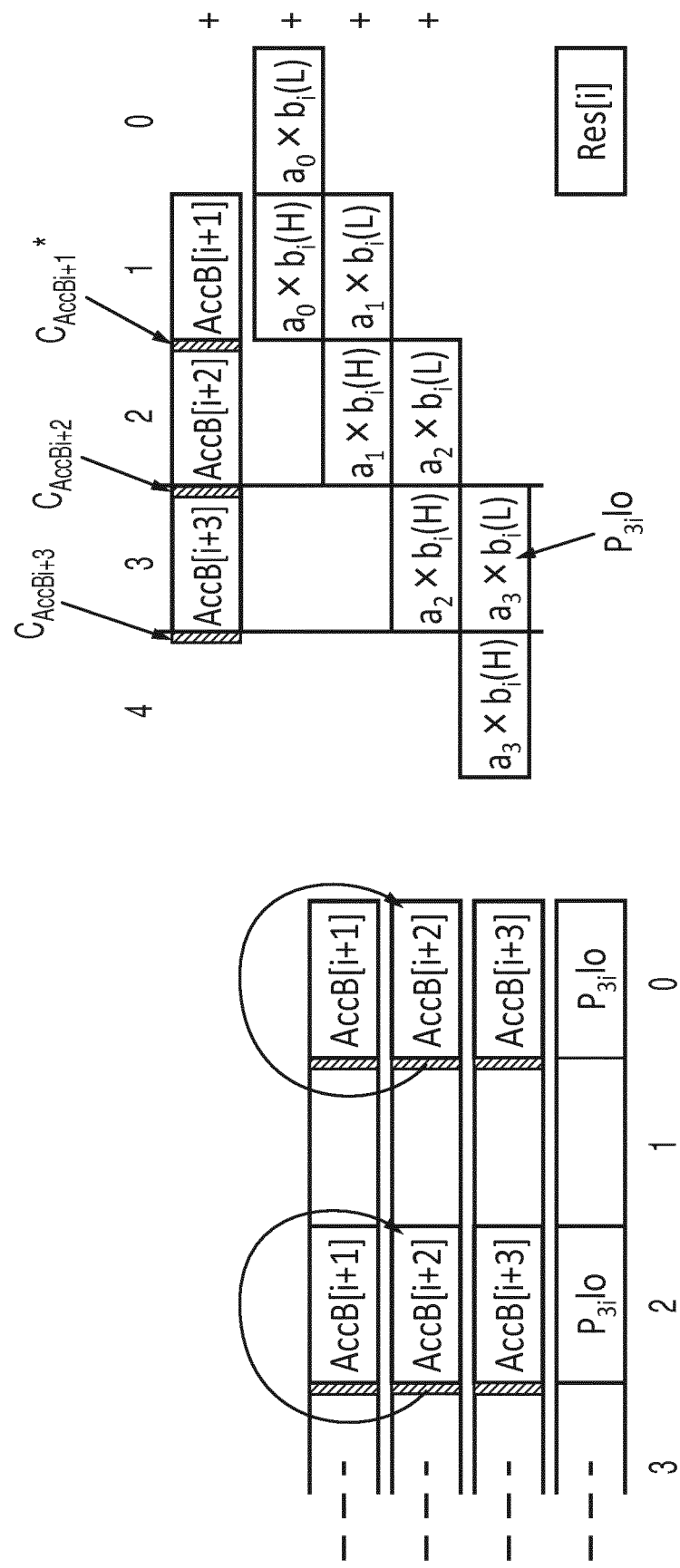

FIG. 10E: this instruction is part of the first carry chain and uses the carry output $C_{accBi+2}$ from FIG. 10C (stored in the upper element of each pair of elements in AccB[i+2]) as the carry input to the addition of lower elements of each pair of elements in AccB[i+3] and $P_3$lo (representing an addition in column 3). The resulting carry output $C_{accBi+2}$ is stored in the upper element of each pair of elements in AccB[i+3].

Figure 10F:
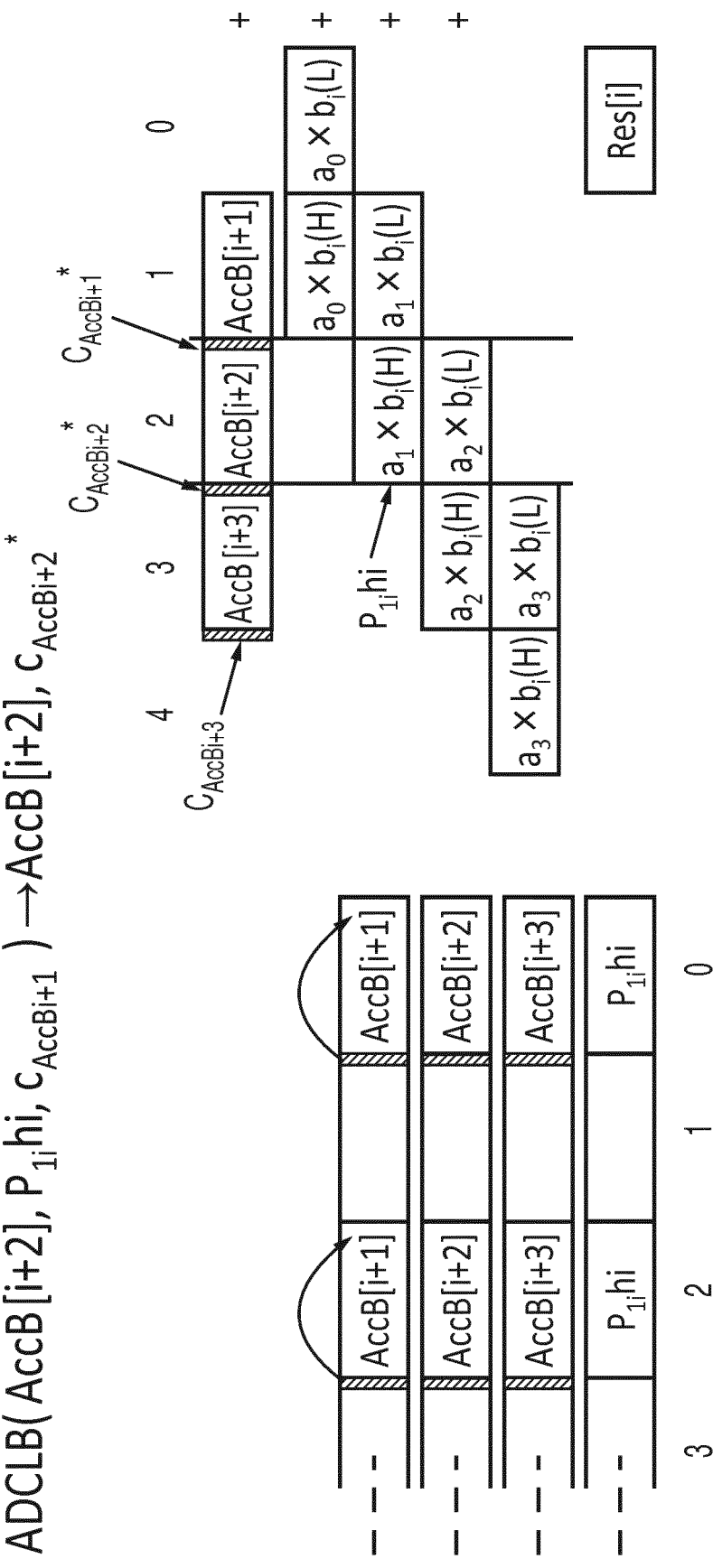

FIG. 10F: this instruction in the second carry chain uses the carry output $C_{accBi+1}$* from FIG. 10D (having bit significance equivalent to the least significant bit of column 2) as the carry input to an addition of AccB[i+2] and $P_1$hi in column 2.

Figure 10G:
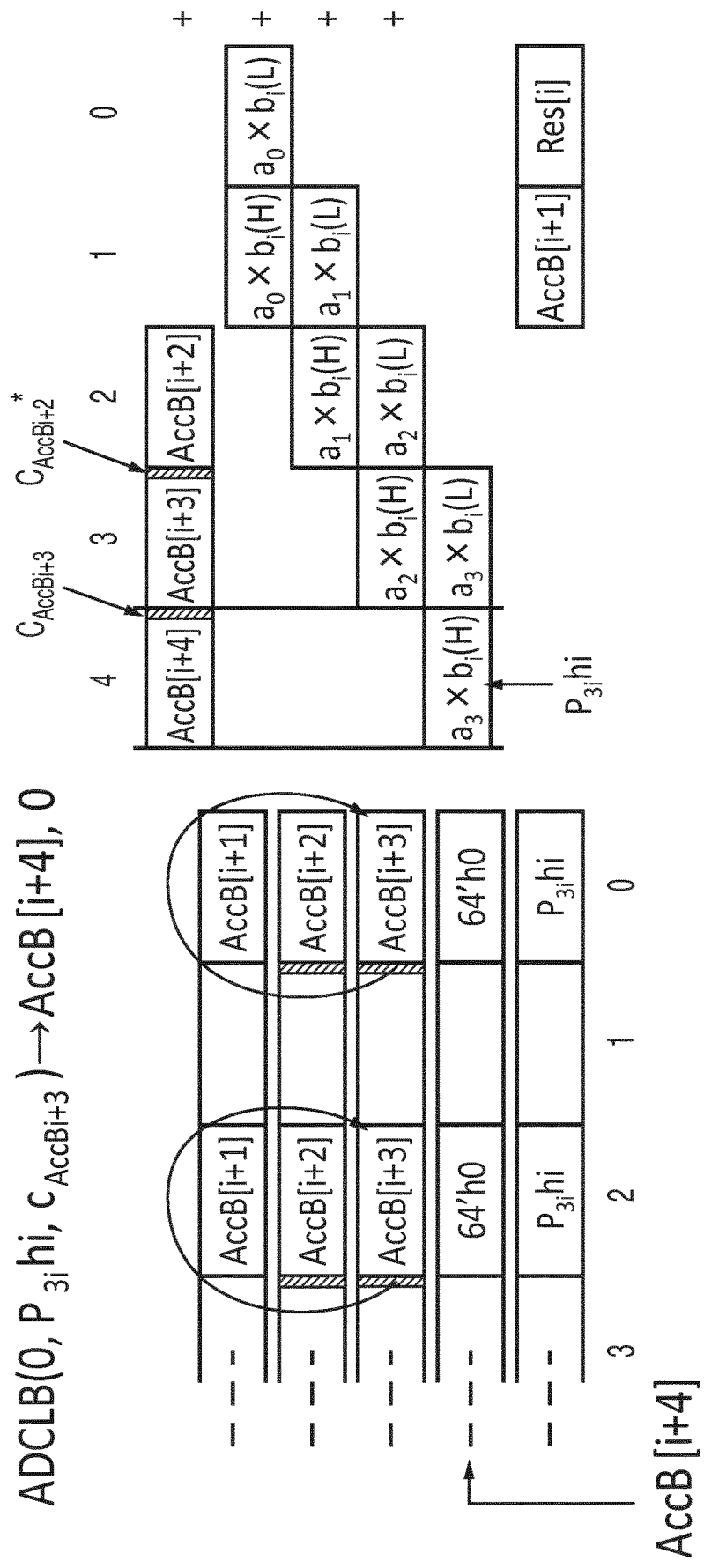

FIG. 10G: this instruction in the first carry chain performs a vector add in even-numbered lanes of AccB[i+4] and $P_3$hi, with the carry input for each add coming from the odd-numbered lanes of AccB[i+3] (resulting from FIG. 10E). Although the instruction may still write the carry output of the respective additions to the least significant bit of the odd-numbered elements of AccB[i+4], in practice these carries are not needed for any subsequent instruction, as this accumulation represents the most significant portion of the result.

Figure 10H:
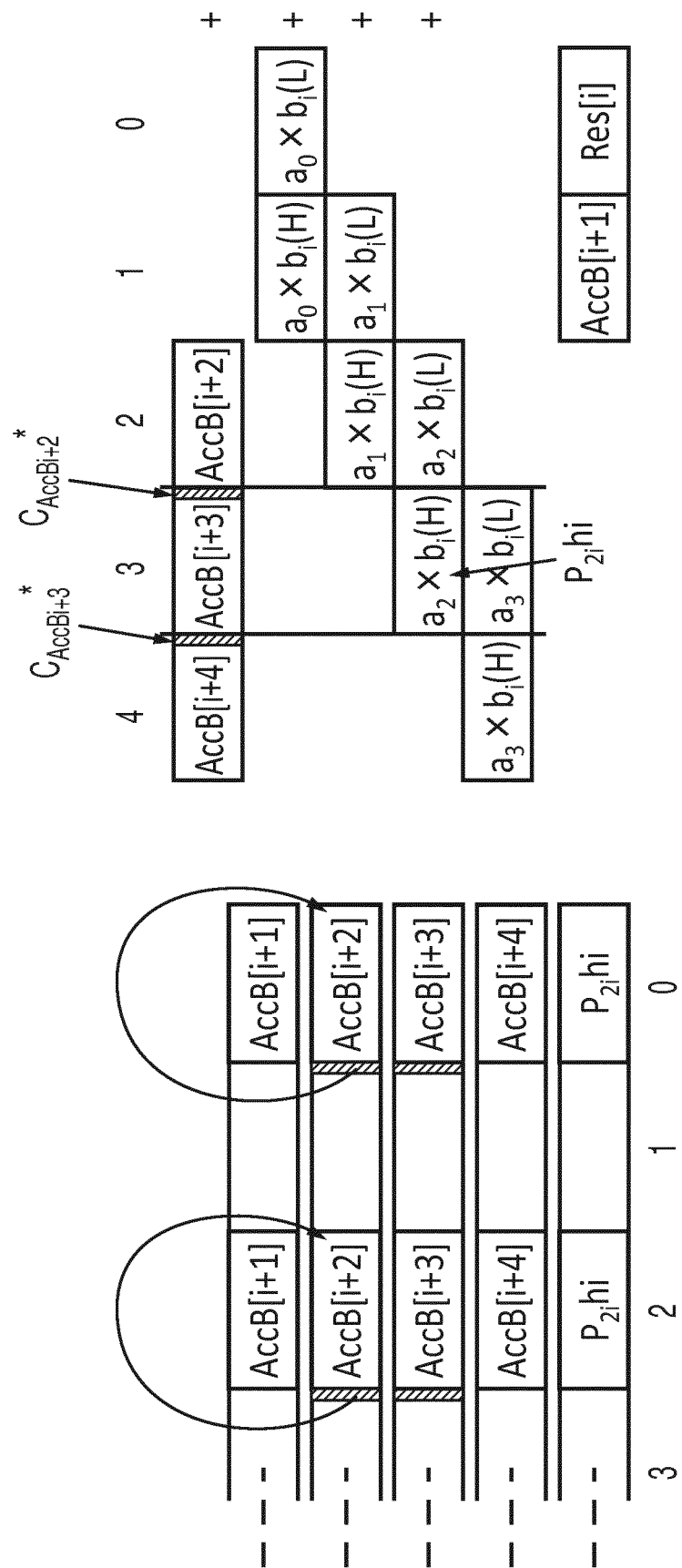

FIG. 10H: this instruction in the second carry chain performs a vector add in even-numbered lanes of AccB[i+3] and $P_2$hi, with the carry input $C_{accBi+2}$* for each add coming from the odd-numbered lanes of AccB[i+2] (resulting from FIG. 10F).

Figure 10I:
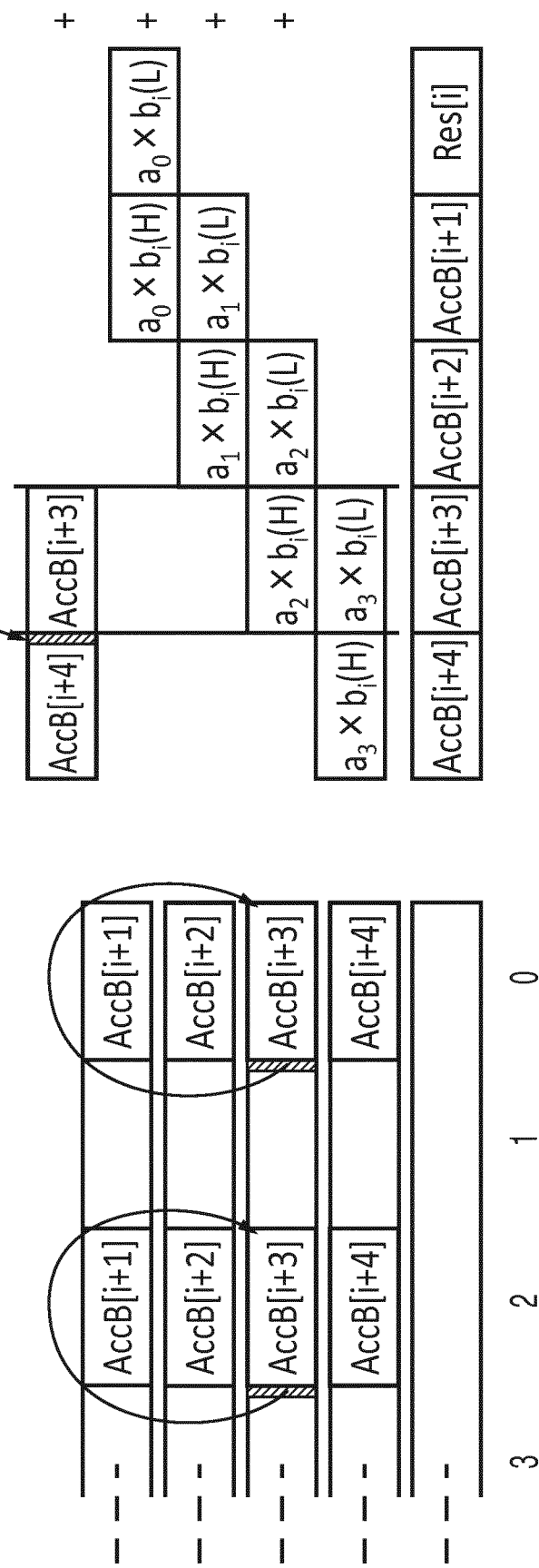

FIG. 10I: finally, this instruction in the second carry chain performs a vector add of the even-numbered lanes of AccB[i+4] with a zeroed data source register (the second data input is zero, because there is only one partial product to be added in the most significant column, which has already been added by the instruction in FIG. 10G). The carry input $C_{accBi+2}$* for each add comes from the odd-numbered lanes of AccB[i+3] (resulting from FIG. 10G). The result of each add is written to even-numbered lanes of the accumulator register AccB[i+4]. Again, although odd-numbered lanes may be written with the carry output of each add as part of the normal behaviour of the instruction, these carries are not needed for any further instructions.

Hence, this example shows how the ADCLB instructions can efficiently allow the carry information for the addition of partial products of a multiplication to be transported alongside the data results themselves, to enable efficient computation of such multiplications applied to input vectors (e.g. $P_0$lo to $P_3$hi) with elements of power-of-two numbers of bits, so that no unpacking of the results of vector multiply instructions are needed before performing the additions. This improves performance for computations involving multiplications of long integers, e.g. using the Karatsuba algorithm.

Figure 11:
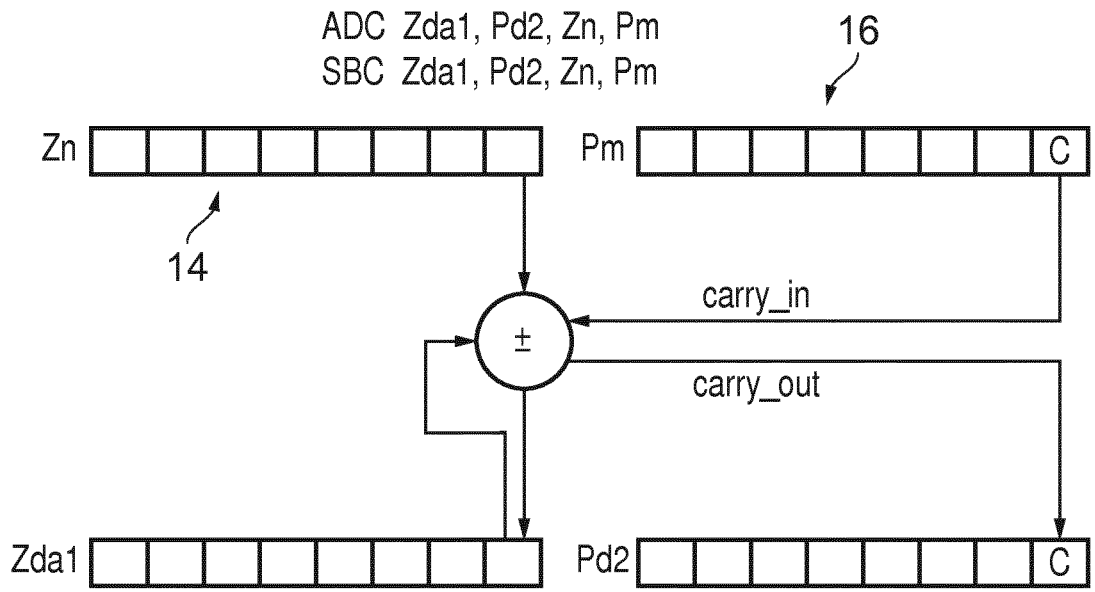
FIG. 11 shows a second example of a vector add-with-carry instruction which uses predicate registers to transport carry values for the additions or subtractions.

FIG. 11 shows an alternative way of implementing the add-with-carry instruction. Instead of taking the carry inputs from alternate elements of a vector register, the carry inputs are obtained from a corresponding predicate field of an input predicate register Pm from the predicate register file 16. Similarly the carry output is written to a corresponding predicate field in a destination predicate register Pd2. With this approach, the vector can be fully occupied with real data values as there is no need to represent the carries in every other element. Hence, for an eight-element vector, this would allow eight separate accumulations to be performed in response to the same instruction. The result vector Zda1 has each element set to the sum or difference of the previous value of that element and a corresponding element of the data source vector Zn. The carry input for the addition is extracted from the corresponding predicate field of an input predicate register Pm, and the carry output from the addition is written to a corresponding predicate field of an output predicate register Pd2. Again, add and subtract variants can be provided similar to those shown in FIGS. 3 and 4, so that the carry input/output can represent carry or borrow information (the borrow representing a deduction to be made from the next most significant digit, whereas the carry represents an addition to be made to the next most significant digit—i.e. the borrow is a carry of −1).

While the approach shown in FIG. 11 can result in a more densely packed vector register file and hence enable the accumulations to be performed in half the number of instructions (e.g. there is no need for separate ADCLB and ADCLT instructions as all the elements of the source data vector can be processed in one instruction), it may require a more complex modification of the microarchitecture since an additional write to the predicate register file is needed by the instruction in addition to writing to the vector register file, which would be unusual for many vector micro architectures. Hence whether the approach in FIGS. 3 and 4 or FIG. 11 is taken may depend on a trade off between efficiency in software and efficiency in hardware microarchitecture.

Figure 12:
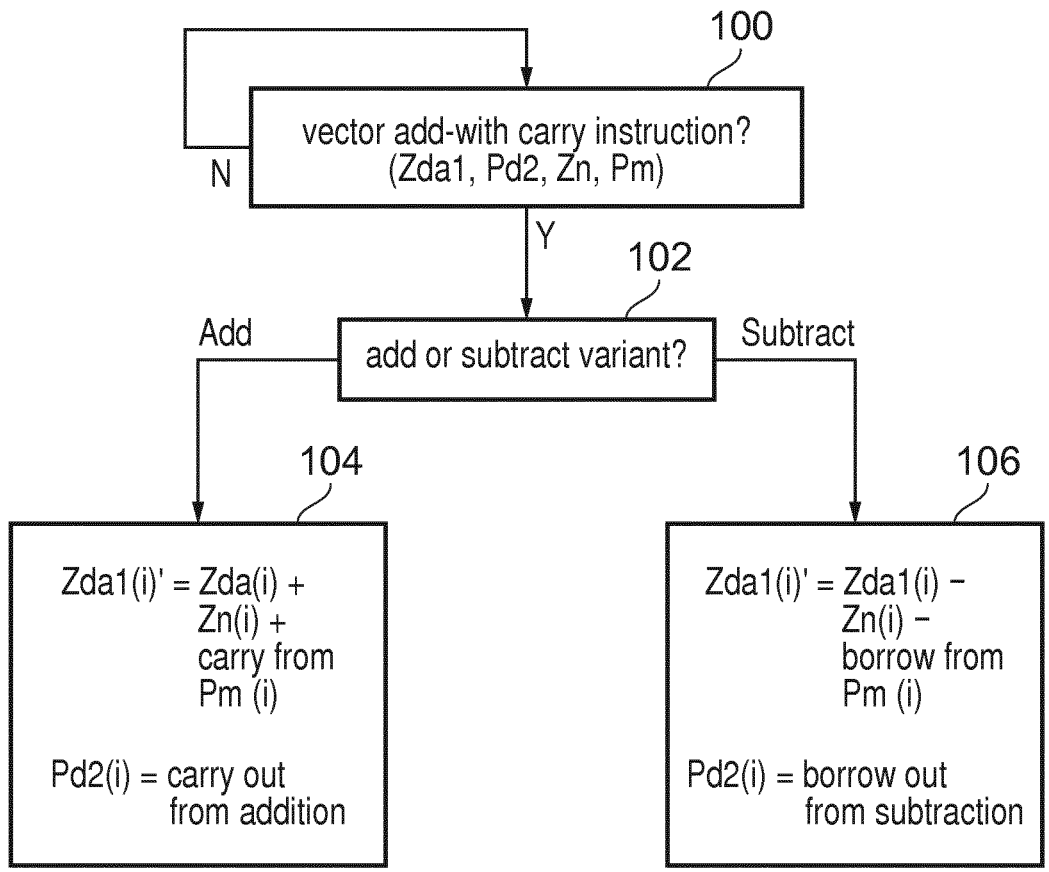
FIG. 12 is a flow diagram illustrating processing of the vector add-with-carry instruction according to the example of FIG. 11.

FIG. 12 shows a flow diagram illustrating processing of the predicate form of the add-with-carry instruction. At step 100 it is detected whether such a vector add-with-carry instruction has been encountered and if not then the instruction decoder 6 controls the processing circuitry 4 to perform the other operation represented by the type of instruction detected. If the instruction is the vector add-with-carry instruction, then at step 102 it is detected whether the instruction is the add or subtract variant. Note that there are no first and second (top or bottom) variants tor this instruction, because by moving the carry information to separate predicate registers, it is not necessary to reserve half the elements for carries and so it is possible to act on all of the elements of the data source register in a single instruction.

If the vector add-with-carry instruction is the add variant then at step 104 the new value of each element i of the destination register, $Zda1(i)'$, is set equal to the sum of the previous value of that data element $Zda1(i)$, the corresponding data element of the data source vector register $Zn(i)$ and the carry input taken from the corresponding predicate field i of the input predicate register $Pm(i)$. Also the corresponding predicate field of the output predicate register $Pd2(i)$ is set equal to the carry output from the addition.

If the instruction is a subtract variant then at step 106 each element $Zda1(i)'$ of the destination register is set to a new value which corresponds to the previous value of that element $Zda1(i)$, minus the corresponding element $Zn(i)$ of the data source register and minus the borrow value indicated by the corresponding predicate field of the input predicate register $Pm(i)$. Again the corresponding predicate field $Pd2(i)$ of the output predicate register is set equal to the borrow output of the subtraction. It will be appreciated that steps 104 and 106 are performed separately for each respective element position (i.e. i=0 . . . N-1 where N is the total number of elements in the vector).

While FIGS. 11 and 12 show an example where the same register Zda1 acts as both the destination vector register and the first source vector register, again it is also possible to provide a non-destructive variant in which a separate register is specified as the first source vector register.

A predicated variant of the add-with-carry instruction shown in FIG. 11 may also be provided, with predication being applied on an element-by-element basis in a similar way to shown in FIG. 2.

Figure 13:
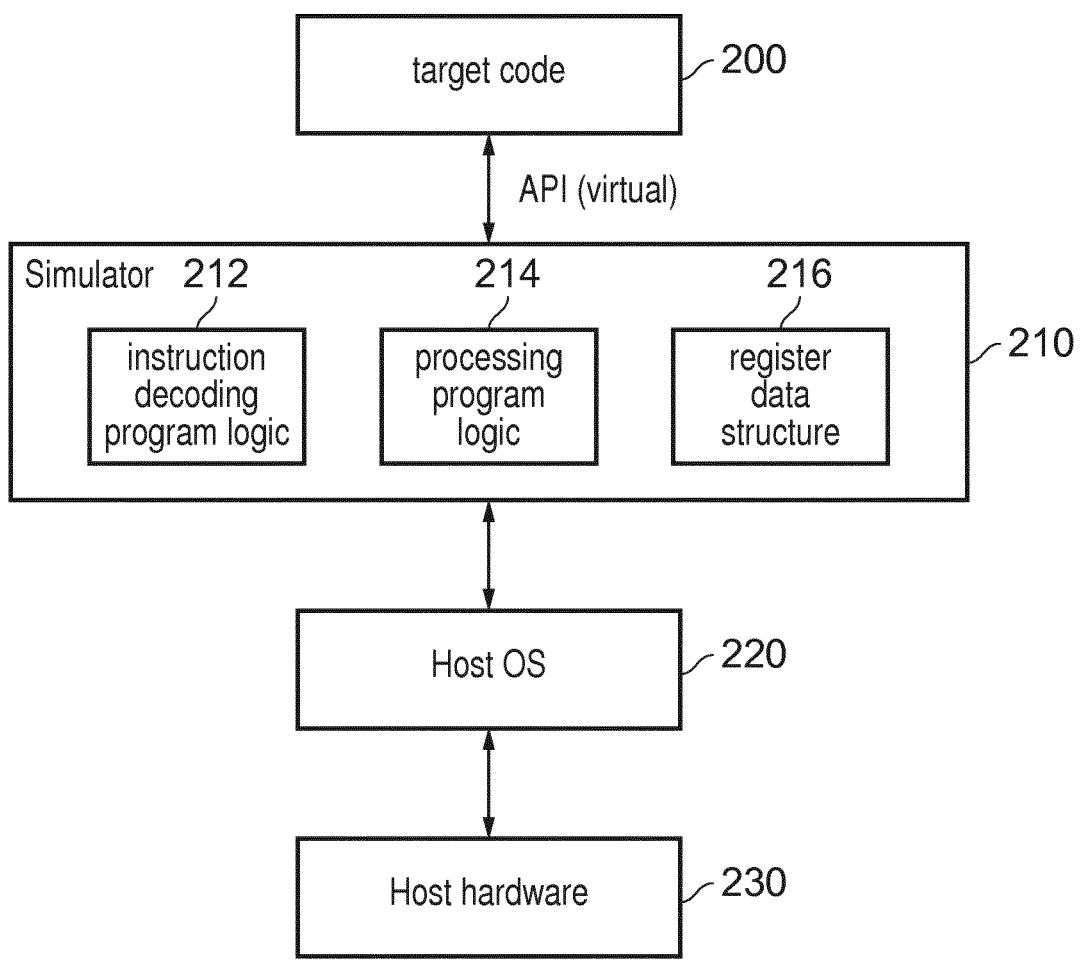
FIG. 13 illustrates a simulator example that may be used.

FIG. 13 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 230, optionally running a host operating system 220, supporting the simulator program 210. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 230), some simulated embodiments may make use of the host hardware, where suitable.

The simulator program 210 may be stored on a computer-readable storage medium (which may be a non-transitory medium), and provides a program interface (instruction execution environment) to the target code 200 (which may include applications, operating systems and a hypervisor) which is the same as the application program interface of the hardware architecture being modelled by the simulator program 210. Thus, the program instructions of the target code 200 may be executed from within the instruction execution environment using the simulator program 210, so that a host computer 230 which does not actually have the hardware features of the apparatus 2 discussed above can emulate these features. For example the simulator program 210 may comprise instruction decoding program logic 212, processing program logic 214, and a register data structure 216 corresponding in functionality to the instruction decoder 6, processing circuitry 4 and registers 10 respectively. For example, the decoding program logic 212 could comprise a series of "if" statements of the simulator program 210 for checking the instruction encoding of an instruction of the target code 200 to determine the operations to be performed, and the processing program logic 214 could correspond to the "then" routines to be activated for particular instructions to map them to corresponding instructions to be executed by the host operating system 220. The register data structure 216 could comprise a region of memory allocated for emulating the registers of the simulated apparatus 2 being simulated by the simulator program 210.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
processing circuitry to perform data processing;
instruction decoding circuitry to decode instructions to control the processing circuitry to perform the data processing; and
a plurality of vector registers to store vector operands comprising a plurality of data elements; in which:
the instruction decoding circuitry is responsive to a vector add-with-carry instruction specifying a destination vector register, a first data source vector register, a second data source vector register, and a carry source vector register, at least the destination vector register and the carry source vector register each specifying operands comprising at least one pair of data elements, each pair comprising a first data element and a second data element, to control the processing circuitry, for each pair of data elements of the destination vector register, to:
update the first data element of the pair of data elements of the destination vector register with a value corresponding to a result of an addition of a first source data value obtained from a selected data element of the first data source vector register, a second source data value obtained from a selected data element of the second data source vector register, and a carry value obtained from the second data element of a corresponding pair of data elements of the carry source vector register; and
update the second data element of the pair of data elements of the destination vector register with a value corresponding to a carry output of said addition;
wherein the first data element of the pair of data elements of the destination vector register, updated with the value corresponding to the result of the addition, and the second data element of the pair of data elements of the destination vector register, updated with the value corresponding to a carry output of said addition, are data elements of the same vector register.

2. The apparatus according to claim 1, in which the first data source vector register is the same register as the destination vector register, and the first source data value comprises a previous value of the first data element of the pair of data elements of the destination vector register.

3. The apparatus according to claim 1, in which each pair of data elements comprises a pair of adjacent data elements.

4. The apparatus according to claim 1, in which when the number of pairs of data elements in the destination vector register and the carry source vector register is at least two, the first data elements of the pairs are interleaved with the second data elements of the pairs.

5. The apparatus according to claim 1, in which in response to the vector add-with-carry instruction, the instruction decoding circuitry is configured to control the processing circuitry to:

obtain the carry value from a least significant bit of the second data element of the corresponding pair of data elements of the carry source vector register, and
update a least significant bit of the second data element of the pair of data elements of the destination vector register with the value corresponding to the carry output of said addition.

6. The apparatus according to claim 5, in which in response to the vector add-with-carry instruction, for both the carry source vector register and the destination vector register, remaining bits of the second data element, other than the least significant bit, are unused.

7. The apparatus according to claim 1, in which each data element comprises $2^N$ bits, and the second source data value comprises $2^N$ bits, where N is an integer.

8. The apparatus according to claim 1, in which the second data source vector register also specifies an operand comprising at least one pair of data elements, each pair comprising a first data element and a second data element;
in response to a first variant of the vector add-with-carry instruction, the second source data value comprises a value obtained from the first data element of a corresponding pair of data elements of the second data source vector register; and
in response to a second variant of the vector add-with-carry instruction, the second source data value comprises a value obtained from the second data element of the corresponding pair of data elements of the second data source vector register.

9. The apparatus according to claim 1, wherein in response to a predicated variant of the vector add-with-carry instruction associated with a predicate value specifying at least one predicate indication, each predicate indication corresponding to one of said at least one pair of data elements of the destination vector register, the instruction decoding circuitry is configured to control the processing circuitry to:
for a pair of data elements for which the corresponding predicate indication has a first value, perform said update of the first data element of the pair with the value corresponding to the result of the addition and said update of the second data element of the pair with the carry output of said addition; and
for a pair of data elements for which the corresponding predicate indication has a second value, suppress said update of the first data element of the pair with the value corresponding to the result of the addition and said update of the second data element of the pair with the carry output of said addition.

10. The apparatus according to claim 1, in which in response to an add variant of the vector add-with-carry instruction, the addition comprises adding the first source data value, the second source data value and the carry value; and
in response to a subtract variant of the vector add-with-carry instruction, the addition comprises a subtraction of the second source data value from the first source data value with the carry value indicating a borrow value for the subtraction, and the carry output comprises a borrow output of the subtraction.

11. A non-transitory storage medium storing a computer program for controlling a host processing apparatus to provide an instruction execution environment for executing instructions of target program code, the computer program comprising:

instruction decoding program logic to decode instructions of the target program code to control processing program logic to perform data processing; and a vector register data structure to store data representing a plurality of vector registers for storing vector operands comprising a plurality of data elements; in which:

the instruction decoding program logic is responsive to a vector add-with-carry instruction specifying a destination vector register, a first data source vector register, a second data source vector register, and a carry source vector register, at least the destination vector register and the carry source vector register each specifying operands comprising at least one pair of data elements, each pair comprising a first data element and a second data element, to control the processing program logic, for each pair of data elements of the destination vector register, to update the vector register data structure to:

update the first data element of the pair of data elements of the destination vector register with a value corresponding to a result of an addition of a first source data value obtained from a selected data element of the first data source vector register, a second source data value obtained from a selected data element of the second data source vector register, and a carry value obtained from the second data element of a corresponding pair of data elements of the carry source vector register; and update the second data element of the pair of data elements of the destination vector register with a value corresponding to a carry output of said addition;

wherein the first data element of the pair of data elements of the destination vector register, updated with the value corresponding to the result of the addition, and the second data element of the pair of data elements of the destination vector register, updated with the value corresponding to a carry output of said addition, are data elements of the same vector register.

12. A data processing method comprising:

decoding a vector add-with-carry instruction specifying a destination vector register, a first data source vector register, a second data source vector register, and a carry source vector register, at least the destination vector register and the carry source vector register each specifying operands comprising at least one pair of data elements, each pair comprising a first data element and a second data element; and in response to decoding of the vector add-with-carry instruction, controlling processing circuitry, for each pair of data elements of the destination vector register, to:

update the first data element of the pair of data elements of the destination vector register with a new value corresponding to a result of an addition of a first source data value obtained from a selected data element of the first data source vector, a second source data value obtained from a selected data element of the second data source vector register, and a carry value obtained from the second data element of a corresponding pair of data elements of the carry source vector register; and update the second data element of the pair of data elements of the destination vector register with a value corresponding to a carry output of said addition;

wherein the first data element of the pair of data elements of the destination vector register, updated with the value corresponding to the result of the addition, and the second data element of the pair of data elements of the destination vector register, updated with the value corresponding to a carry output of said addition, are data elements of the same vector register.

13. An apparatus comprising:

processing circuitry to perform data processing;

instruction decoding circuitry to decode instructions to control the processing circuitry to perform the data processing;

a plurality of vector registers to store vector operands comprising a plurality of data elements; and a plurality of predicate registers comprising a plurality of predicate fields for storing predicate values for controlling masking of operations performed by the processing circuitry; in which:

the instruction decoding circuitry is responsive to a vector add-with-carry instruction specifying a destination vector register, a first data source vector register, a second data source vector register, an input predicate register and an output predicate register, to control the processing circuitry, for a given data element of the destination vector register, to:

update the given data element of the destination vector register with a value corresponding to a result of an addition of a first source data value obtained from a corresponding data element of the first data source vector register, a second source data value obtained from a corresponding data element of the second data source vector register, and a carry value obtained from a corresponding predicate field of the input predicate register; and update a corresponding predicate field of the output predicate register with a value corresponding to a carry output of said addition.

14. A non-transitory storage medium storing a computer program for controlling a host processing apparatus to provide an instruction execution environment for executing instructions of target program code, the computer program comprising:

instruction decoding program logic to decode instructions of the target program code to control processing program logic to perform data processing; and a register data structure to store data representing a plurality of vector registers to store vector operands comprising a plurality of data elements, and a plurality of predicate registers to store predicate values for controlling masking of vector operations performed by the processing program logic; in which:

the instruction decoding program logic is responsive to a vector add-with-carry instruction specifying a destination vector register, a first data source vector register, a second data source vector register, an input predicate register and an output predicate register, to control the processing circuitry, for a given data element of the destination vector register, to update the register data structure to:

update the given data element of the destination vector register with a value corresponding to a result of a first source data value obtained from a corresponding data element of the first data source vector register, a second source data value obtained from a corresponding data element of the second data source vector register, and a carry value obtained from a corresponding predicate field of the input predicate register; and update a corresponding predicate field of the output predicate register with a value corresponding to a carry output of said addition.

15. A data processing method comprising:

decoding a vector add-with-carry instruction specifying a destination vector register, a first data source vector register, a second data source vector register, an input predicate register and an output predicate register, the input predicate register and the output predicate register selected from among a plurality of predicate registers for storing predicate values for controlling masking of vector operations; and in response to decoding of the vector add-with-carry instruction, controlling processing circuitry, for a given data element of the destination vector register, to:

update the given data element of the destination vector register with a value corresponding to a result of an addition of a first source data value obtained from a corresponding data element of the first data source vector register, a second source data value obtained from a corresponding data element of the second data source vector register, and a carry value obtained from a corresponding predicate field of the input predicate register; and update a corresponding predicate field of the output predicate register with a value corresponding to a carry output of said addition.

\* \* \* \* \*